(12) United States Patent
    Holloway

(10) Patent No.: US 10,739,271 B2
(45) Date of Patent: Aug. 11, 2020

(54) GEMSTONE PERIPHERY LIGHT QUALIFICATION SYSTEM

(71) Applicant: Garry Ian Holloway, Canterbury (AU)

(72) Inventor: Garry Ian Holloway, Canterbury (AU)

( * ) Notice: Subject to any disclaimer, the term of this patent is extended or adjusted under 35 U.S.C. 154(b) by 0 days.

(21) Appl. No.: 16/428,960

(22) Filed: May 31, 2019

(65) Prior Publication Data

US 2020/0011807 A1    Jan. 9, 2020

Related U.S. Application Data

(60) Provisional application No. 62/678,341, filed on May 31, 2018.

(51) Int. Cl.
    *G01N 21/00* (2006.01)
    *G01N 21/87* (2006.01)
(52) U.S. Cl.
    CPC ............. *G01N 21/87* (2013.01); *G01N 21/00* (2013.01)

(58) Field of Classification Search
    CPC .......... G01N 21/88; G01N 21/87; G01N 21/00
    See application file for complete search history.

(56) References Cited

U.S. PATENT DOCUMENTS

2005/0190356 A1 * 9/2005 Sasian .................... G01N 21/01
                                                      356/30

* cited by examiner

*Primary Examiner* — Abdullahi Nur
(74) *Attorney, Agent, or Firm* — Richard G. Topolewski

(57) ABSTRACT

A gemstone periphery light qualification system that includes a gemstone parameter instrument, a periphery light gauge and a qualifier. The gemstone parameter instrument provides gemstone parameters where the gemstone parameters can provide a girdle dimension. The periphery light gauge that generates a periphery light score using the gemstone parameters and a known lighting configuration to quantify the light performance of the periphery of the top view of the cut gemstone. The qualifier that uses the girdle dimension and the periphery light score to generate a qualified gemstone size rating.

20 Claims, 21 Drawing Sheets

640

| Cut Parameters | | Defocus | |
|---|---|---|---|
| Shape and cut | | Parameters quality | |
| Brilliant | | 6 | |

Proportions | Advanced | Advanced 2 | New

| Diameter | 6.28 mm |
|---|---|
| Sec. diameter | 6.32 mm |
| Total depth | 4.04 mm |
| Cm height (bezel) | 16.3 % |
| Crown angle | 36.20 ° |
| Table diameter | 55.5 % |
| Pav. depth (bezel) | 43.9 % |
| Pavilion angle (max) | 41.29 ° |
| Culet | Pointed |
| Girdle avg (bezel) | Slightly Thic |

Carat weight 1.00 ct    Spread

FIG. 6C

GEMSTONE PERIPHERY LIGHT QUALIFICATION SYSTEM

CROSS-REFERENCE TO RELATED APPLICATION

This application claims the benefit of U.S. Provisional Application No. 62/678,341, filed May 31, 2018.

BACKGROUND OF THE INVENTION

Field of the Invention

The present invention relates to the field of gemstone evaluation and more particularly to the field of the actual and visual size of a gemstone and the evaluation and methods of that.

Background of the Invention

There are many variables in assessing the quality, desirability and beauty of a cut gemstone such as a diamond. Looking specifically at diamonds particularly the round brilliant cut, there has been a desire for a simple cut grading system. Unlike color and clarity for which a general consensus has developed over the years, there are a number of different systems for grading the cut of a round brilliant cut diamond. The cut systems are based on the reasonable assumption about the relationship between the proportions and appearance of the round brilliant diamond. Inherent in these systems is the premise that there is one set (or a narrow range) of preferred proportions, and that any deviation from this set of proportions diminishes the attractiveness of a diamond.

Most of the brilliance and sparkle of a diamond comes from its cut proportions, but unfortunately gemstones, in particular diamonds, are often cut to maximize their carat weight, not to maximize their brilliance and sparkle.

In 1919, Marcel Tolkowsky wrote a Master's Thesis on the ideal proportions for round diamonds. Diamond experts generally consider the proportions designated by Tolkowsky well-chosen and providing a good balance between the sometimes opposing beauty features, for example a good balance between brilliance versus fire. The Tolkowsky proportions have provided a benchmark for the past 100 years. FIG. 1 illustrates the various parameters that define the cut of a diamond, including table, crown and pavilion angles, culet and girdle. The benchmark set by Tolkowsky was of a diamond with crown angle of 34.5°, pavilion 40.75° and table of 53%. Subsequently mathematicians have determined that the addition of a girdle thickness between the crown and the pavilion results in an adjustment of the table size. The mathematicians feel a thin girdle has an optimum table size of around 54% to 56%. The mathematicians feel the optimum table size for a diamond with a medium girdle thickness is between 56% and 58%.

Cut grading systems have been developed around the Tolkowsky benchmark proportions. The cut grading system classify high quality cut gemstones from lesser quality cuts. The current grading systems for diamonds allows for variation from the Tolkowsky benchmark proportions. A diamond with a slight deviation on each of these measures can rate as excellent or ideal in various round diamond cut grading systems even though the light performance is only good or fair. When a diamond only has fair light performance the diamond does not perform as well as another diamond of the same weight, and it usually appears smaller to the eye.

It is important to note that the independent grading systems fail to show a proportional or comparative size relationship between the graded diamond and any chosen standard; the systems are rejection based. That is, if the gemstone is considered too small but otherwise meets the standards of a higher cut grade, it will be lowered to a lessor cut grade based on the size being below a predetermined standard. In the case of round brilliant grading by the Gemological Institute of America (GIA) the standard for round brilliant cuts could be considered generous for sellers and disadvantageous for buyers. In the case of the American Gem Society Laboratory (AGS) it does offer some grading for cuts in addition to the round brilliant cut, the chosen standards are different for each cut shape. This makes comparison between the relative sizes and weights of different cut shapes difficult if not impossible.

Some cut gemstone grading systems, such as the diamond grading system of the GIA will reject a diamond if the depth percentage is too large because this indicates too small of a front face diameter. However within the allowable depth for an excellent cut grade it is possible to have a diamond with a relatively steep crown angle, or a deep pavilion of more than 41.5° and a slightly thick girdle that results in a smaller diameter for the carat weight. Unfortunately, those "excellent" but deep cut diamonds, will not only have a small diameter but will tend to have low light return at the diamond's edge. Thus there is a problem, a diamond that should be excellent but when look at in by a person's eyes it is perceived small for its weight not only because of the small diameter but also due to the reduced light returned at the edges. The grading systems tend to ignore or oversimplify this poor light performance, choosing to ignore or oversimplify the complex interrelationship of how light reflects and refracts on the facets as the light passes through the diamond.

Various methods to quantify the brilliance and sparkle of a cut gemstone, in particular diamonds, have been developed over the years looking at how the diamond does overall in terms of diamond sparkle and brilliance for example the GemEx Diamond Light Performance® Certificate takes five pictures of the entire top view of the diamond and quantifies the diamond for bright white light (known as Brilliance), bright color light (known as Fire) and scintillation (known as Sparkle). This quantification provides a lot of objective data about the light performance of the diamond and also provides the carat weight of the diamond but it fails to provide information about how big the diamond is when viewed from the top. So just as with other certification methods although it provides perhaps a confusing amount of information about light performance it fails to inform a person how big the diamond actually looks.

The cutting of gemstones, such as diamonds, is a highly skilled art with many variables that combine to create gems of varying quality. The laws of physics dictate that, a gemstone cut to correct proportions and dimensions will reflect a maximum amount of light. An inferior cut gemstone will result in less brightness and thus the gemstone will appears smaller than it should. A gemstone cutter is well aware of the critical weight and they strive to ensure the diamonds and gems they cut from the rough gemstone achieve or just exceed critical weights (e.g. 1 carat, 1.5 carat, 2 carat . . . ) often ignoring the impact on light performance and the apparent size of the cut gemstone.

FIG. 2A is a picture of two 1.00-carat diamonds in a display case. Although the diamonds are the same weight the left diamond appears noticeably smaller. Looking closer in FIG. 2B a close-up of the diamonds still on the black background is provided and the diamond details show how the light performance is substantially different between the left poorly cut diamond and the right well cut diamond and in particular the outer edge of the left diamond provides very little light return and there is little brilliance. Finally, in FIG. 2C the same diamonds are pictured on a lighter background and again the poor performance of the identical weight but poorly cut diamond on the left is clearly apparent.

Recent research, including systems developed by this inventor as well as those by the GIA, have shown that there are diamonds outside of the proportions indicated by Tolkowsky that can be equally beautiful. Findings have shown that combining crown angles deviating from Tolkowsky with inverse deviation in the pavilion angles can result in a cut that is as brilliant and fiery as the Tolkowsky benchmark.

A key factor for a diamond is how big the diamond appears, which—as shown above—is not always directly correlated to the carat weight. From the point of view of a layperson the carat weight is thought to be a solid objective measure and is often considered to directly relate to the diamond size. But knowing the carat weight is not a reliable indicator of the actual top-view size nor the apparent size when considering light performance, especially light performance when the gemstone is illuminated in a way that mimics how it will receive light in a ring or jewelry.

There is a need for an improved qualification system that provides a simple objective measure to quantify the cut of the gemstone and its impact of how big the gemstone appears.

SUMMARY OF THE INVENTION

A gemstone periphery light qualification system 500 that includes a gemstone parameter instrument, a periphery light gauge and a qualifier. The gemstone parameter instrument that quantifies the girdle dimension. The periphery light gauge that generates a periphery light score using the gemstone parameters and a known lighting configuration to quantify the light performance of the periphery of the top-view of the cut gemstone. The qualifier uses the girdle dimension and the periphery light score to generate a qualified gemstone rating.

BRIEF DESCRIPTION OF THE DRAWINGS

FIG. 6C illustrates the gemstone parameter instrument as a gemstone parameter input form.

DETAILED DESCRIPTION

Figure 2A:
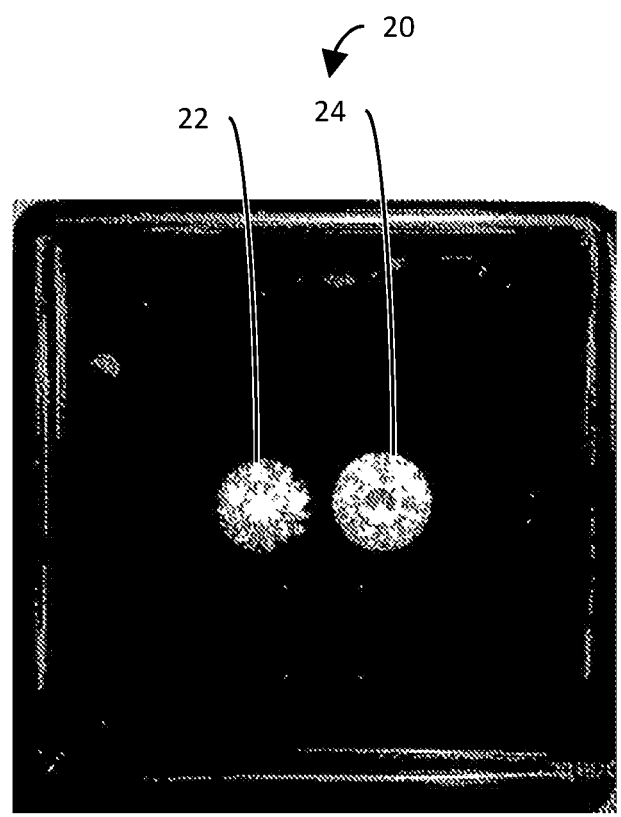
FIGS. 2A, 2B and 2C illustrates pictures of two 1-carat diamonds with different cuts.
Figure 2B:
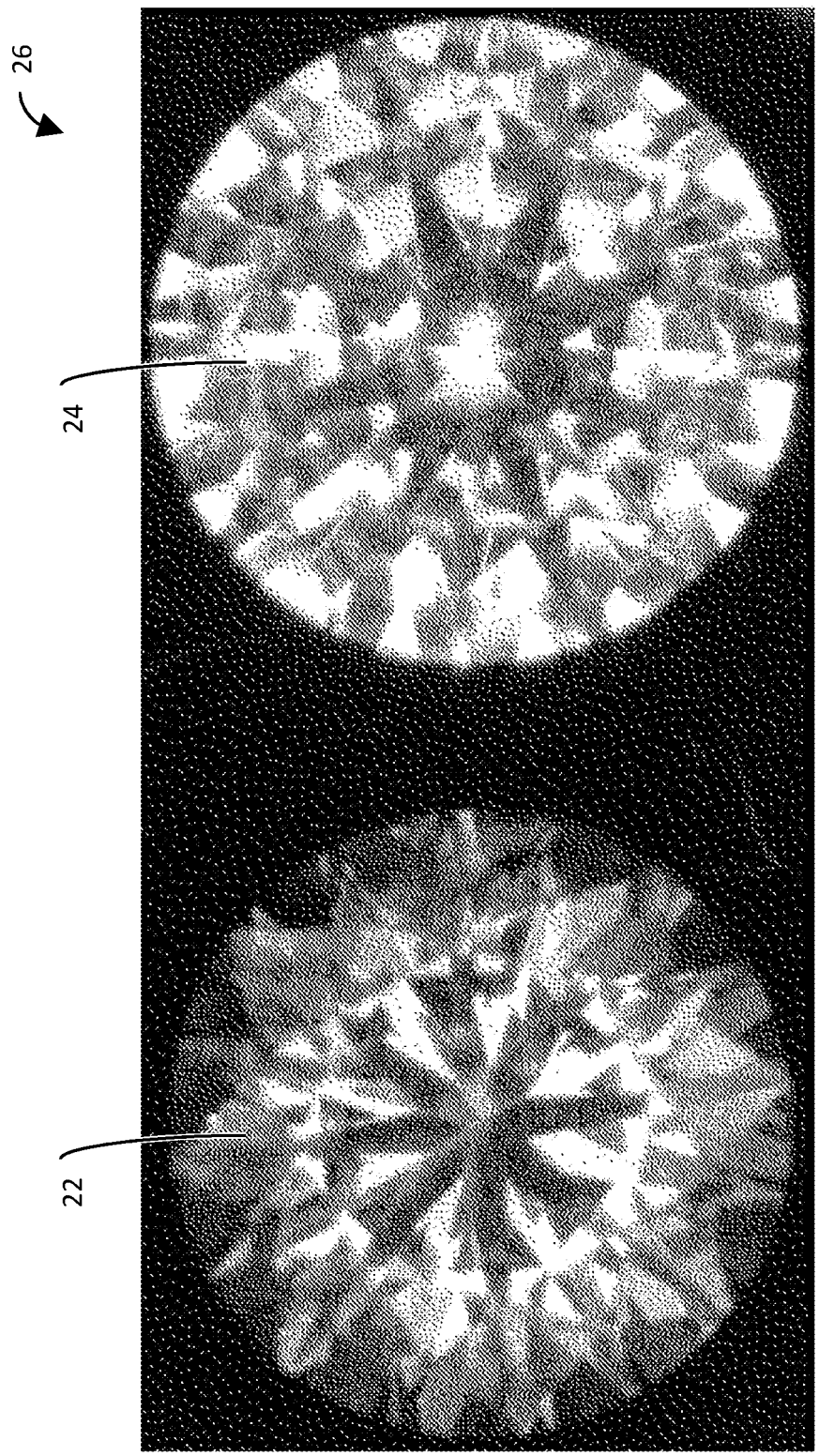
Figure 2C:
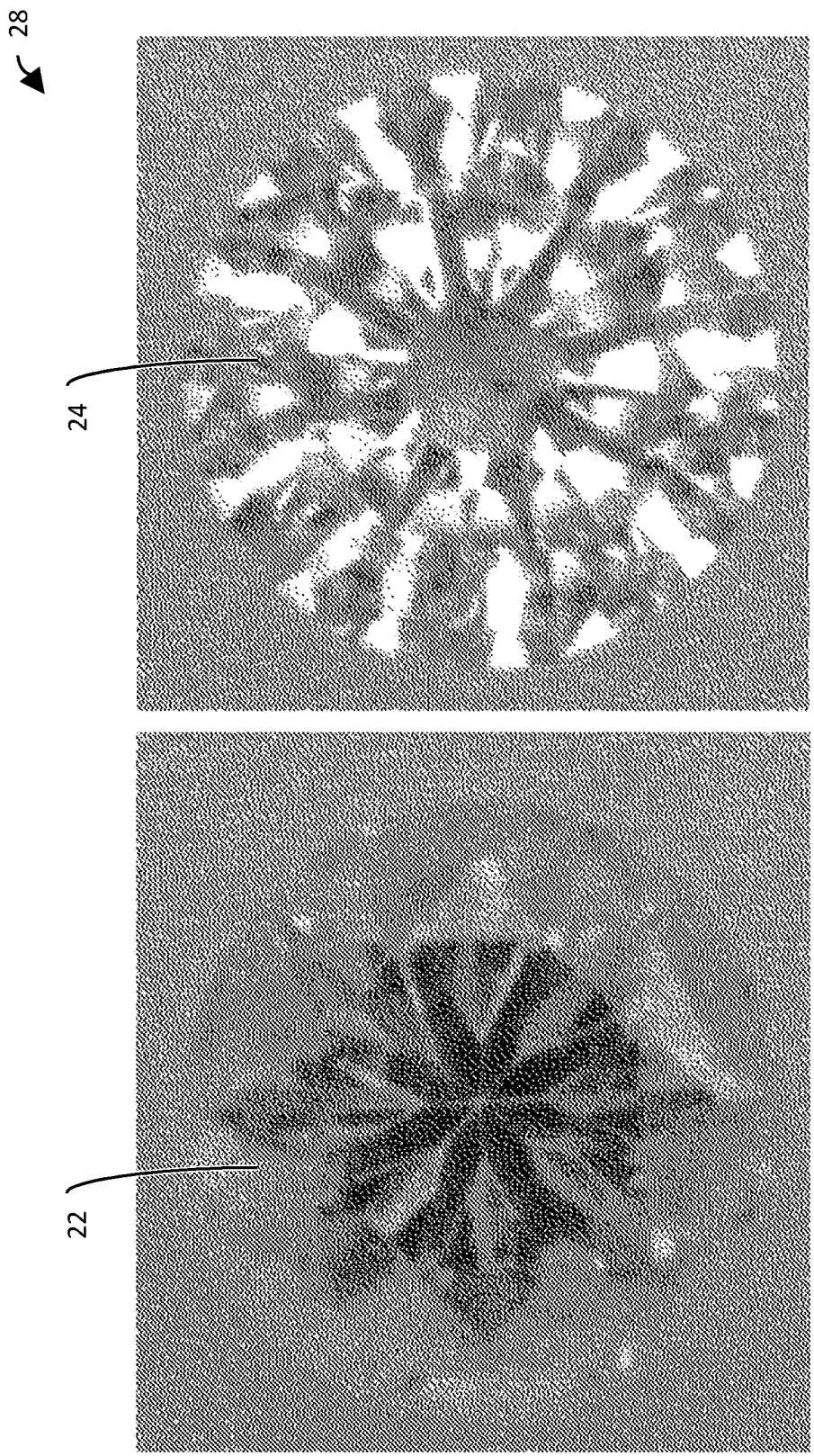

FIGS. 2A, 2B and 2C as discussed in the background illustrates photographs 20, 26 and 28 of two 1.00-carat diamonds taken in the same lighting conditions. The left poor cut diamond 22 is a deep cut, i.e. poor cut, and the right diamond 24 has a good cut. The left poor cut diamond 22 with its deeper cut has a diameter of 6.25 mm. The good cut diamond 24 has the better cut and has a diameter of 6.5 mm. It is apparent that the light returned from the edge of the good cut diamond 24 contributes to its larger appearance, while the poor cut diamond 22 looks small because it suffers from two problems. First the poor cut diamond 22, although of the same weight, has a deep cut (steeper angles) and thus has more of the weight down from the face of the diamond resulting in the smaller 6.25 mm physical diameter. Second, the poor cut diamond 22 is dull around the edges and this contributes to it appearing optically even smaller than its 6.25 mm physical diameter.

Figure 3A:
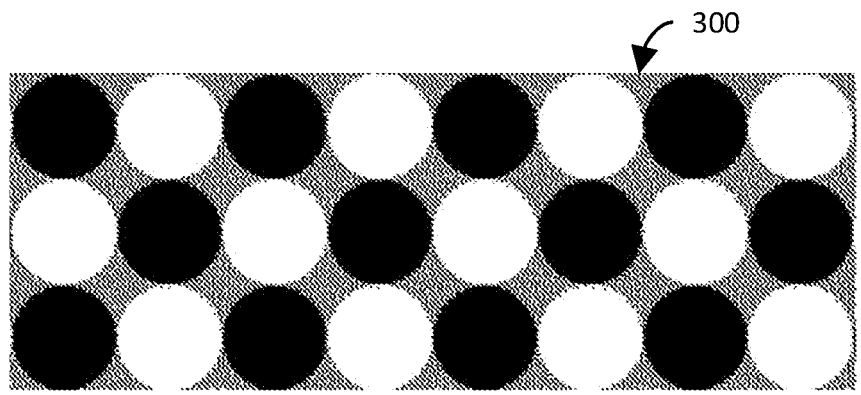
FIGS. 3A, 3B and 3C illustrates optical illusions of how brighter objects appear bigger.
Figure 3B:
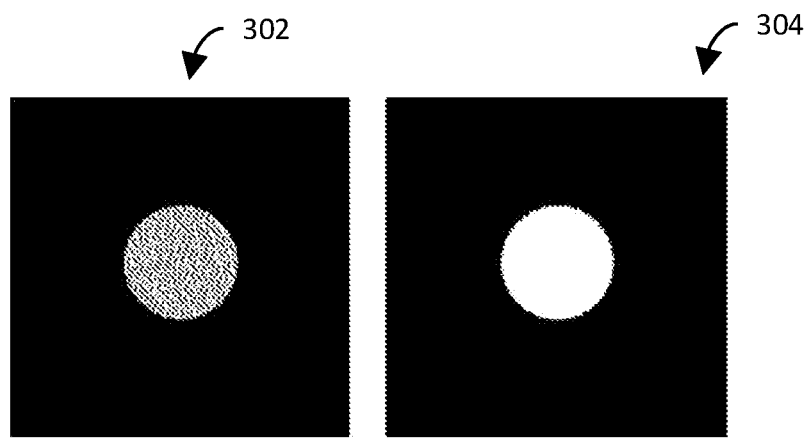
Figure 3C:
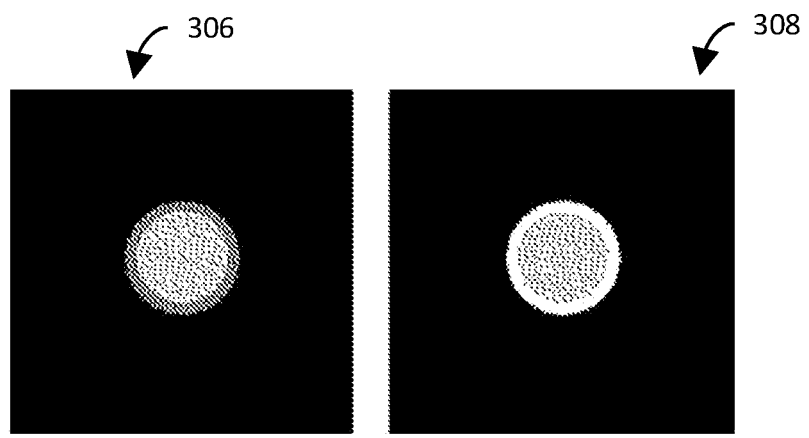

FIGS. 3A, 3B and 3C illustrate the optical illusion property that brighter objects appear bigger. FIG. 3A shows illustration 300 with a black and white circle pattern. When looking at the pattern casually the white circles appear bigger than the black circles, even though they are the same size. FIG. 3B shows on the left a gray circle illustrations 302 and on the right a white circle illustration 304 is shown. Again, the white circle give the impression it is bigger than the gray circle even though both the gray and white circle are the same size. The final set of illustrations in FIG. 3C shows illustration 306 of a gray circle surrounded by a darker gray perimeter and illustration 308 shows a gray circle surrounded by white perimeter. Again, the gray circle surrounded by white appears visually bigger than the gray circle surrounded by darker gray, even though in reality the circles are the same physical size.

Figure 4:
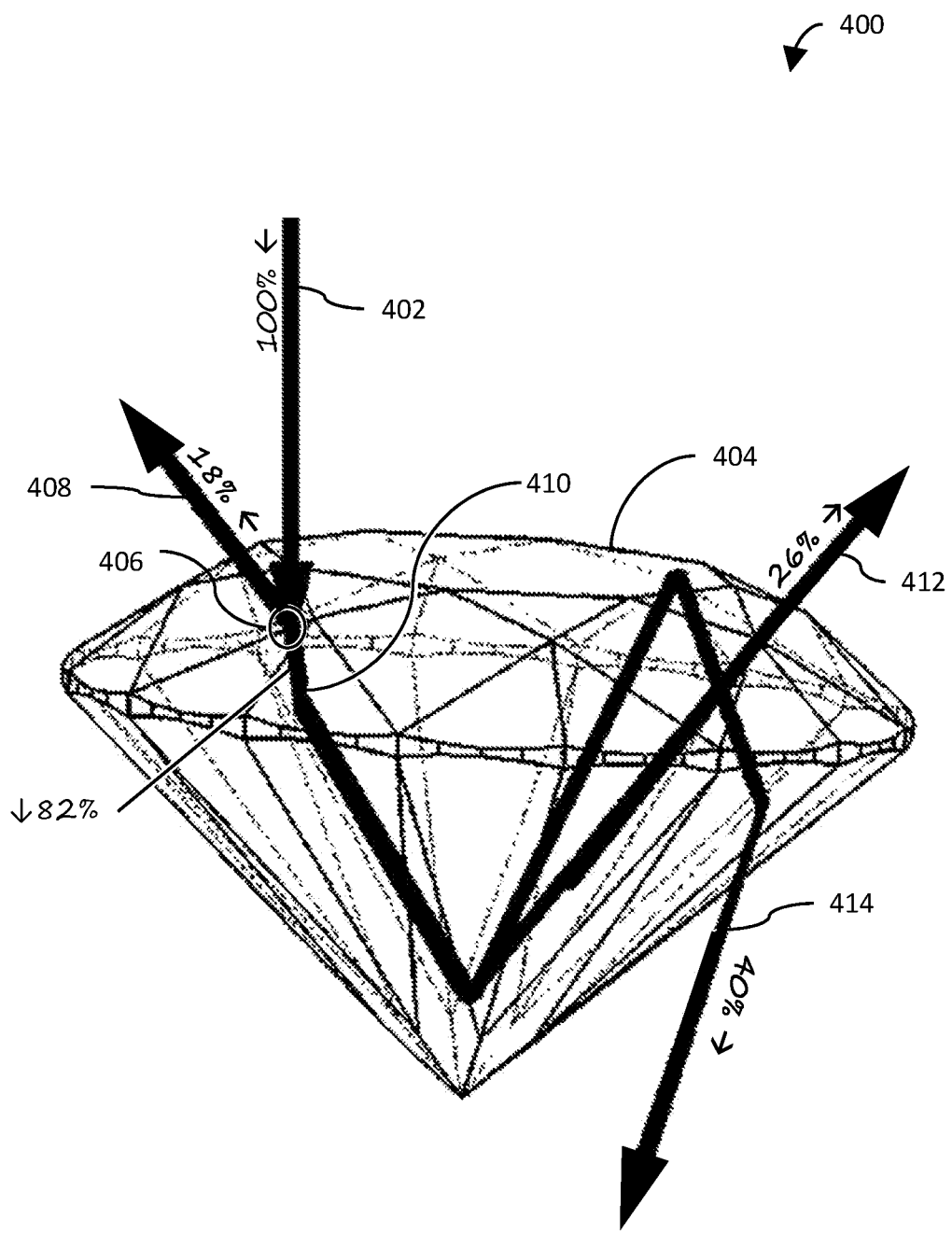
FIG. 4 illustrates how ray tracing is used in virtual diamond analysis.

FIG. 4 provides an illustration 400 of an initial light ray 402 traced through a diamond 404 using computer based ray tracing virtual diamond analysis. The diamond 404 has a poor cut quality. Virtual diamond analysis using ray tracing software is available from programs such as DiamCalc™ and software available from OctoNus™ Software Limited, and others.

When the initial light ray 402 strikes a facet 406 near the edge of a diamond 404. 18% of the light from the initial light ray 402 creates a reflective light ray. 82% of the initial light ray 402 continues as light ray 410. The light continues through the diamond and ultimately a light ray 412 returns out the top, through the crown facet and has 26% of the light from the initial light ray 40 and contributes to the brightness and brilliance of the gemstone. A light ray 414 exits via the bottom facet (i.e. the pavilion) and has 40% of the light from the initial light ray 402. This 40%, since it fails to exit out the top, is known as leakage. Leakage of light reduces periphery light return and contributes to a gemstone appearing smaller. (The remaining 16% of the initial light ray 402 eventually exits via the crown and pavilion facets, but is skipped to simplify the illustration.)

100% light return is not possible, neither is 100% leakage.

As noted above the second reason the small apparent size of the poor cut diamond 22 is the lack of light returned around the edges, which as shown by the ray trace analysis, is caused by light leakage. The leakage of the light out the back is what causes there to be a lack of brilliance around the periphery and thus the edge lacks definition and contributes to the apparent smaller size of the poor cut diamond 22.

Figure 5:
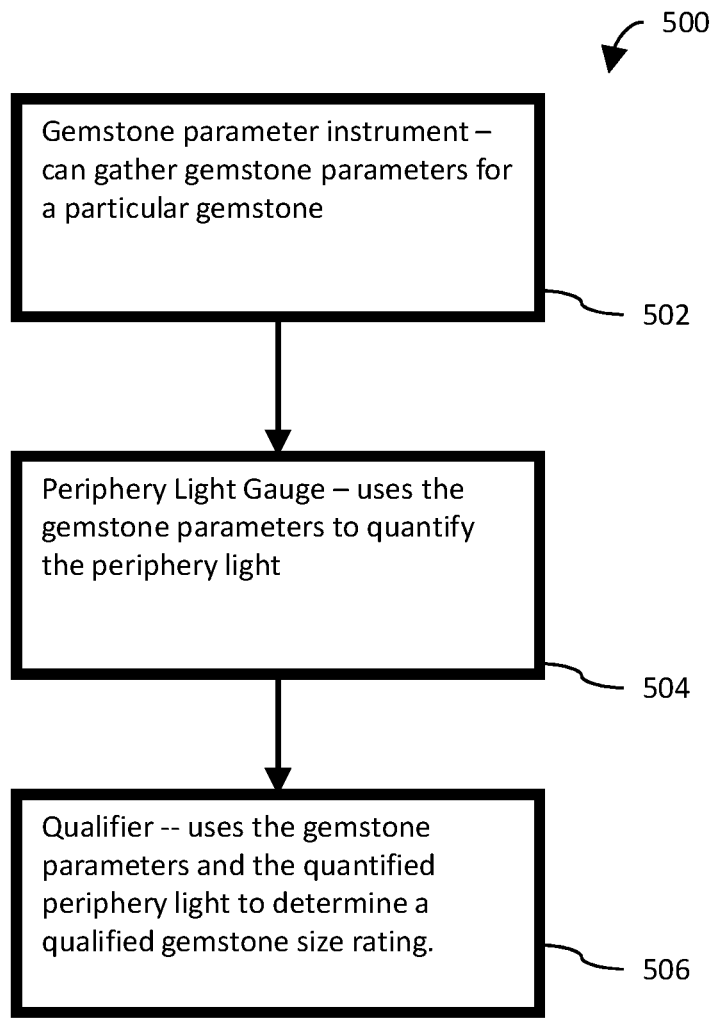
FIG. 5 is a box diagram of the parts of the periphery light qualification system 500 including the gemstone parameter instrument, the periphery light gauge and the qualifier.

FIG. 5 is a block diagram of the parts of a periphery light qualification system 500 including a gemstone parameter instrument 502, a periphery light gauge 504 and a qualifier 506.

The gemstone parameter instrument 502 may gather gemstone parameters for a particular gemstone. The gemstone parameter instrument 502 may be any instrument or technology capable of providing gemstone parameters, for example as shown in FIG. 6A a rough gemstone scanner 600, as shown in FIG. 6B a cut gemstone scanner 620, as shown in FIG. 6C an electronic parameter input form 640, as shown in FIG. 6D a gemstone image capturing system 660 or any other instrument capable of providing gemstone parameters.

The gemstone parameters may include weight (e.g. carats) and cut features (such as crown angle, pavilion angle and table percentage, table dimension, girdle thickness, top view dimensions, weight, star girdle lengths, lower girdle length etc.). The girdle is the widest point of the circumference of a gemstone, it is the perimeter of the stone, girdle separates the gem's pavilion from its crown. The dimension of the girdle may be a diameter if the cut is round or may have several measurements, for example the length and width for an emerald cut gemstone.

Figure 6A:
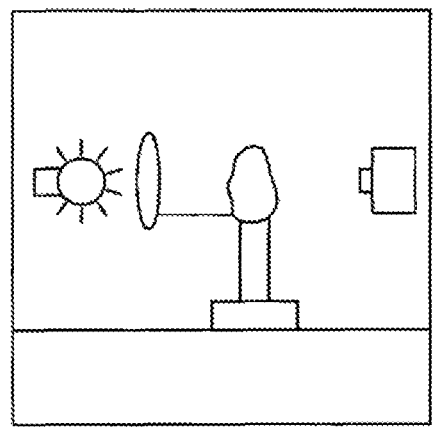
FIG. 6A illustrates the gemstone parameter instrument as a rough gemstone scanner.
Figure 6A:
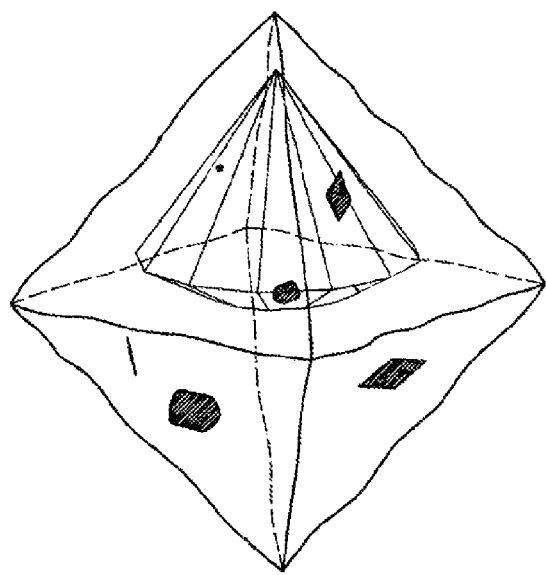
Figure 6B:
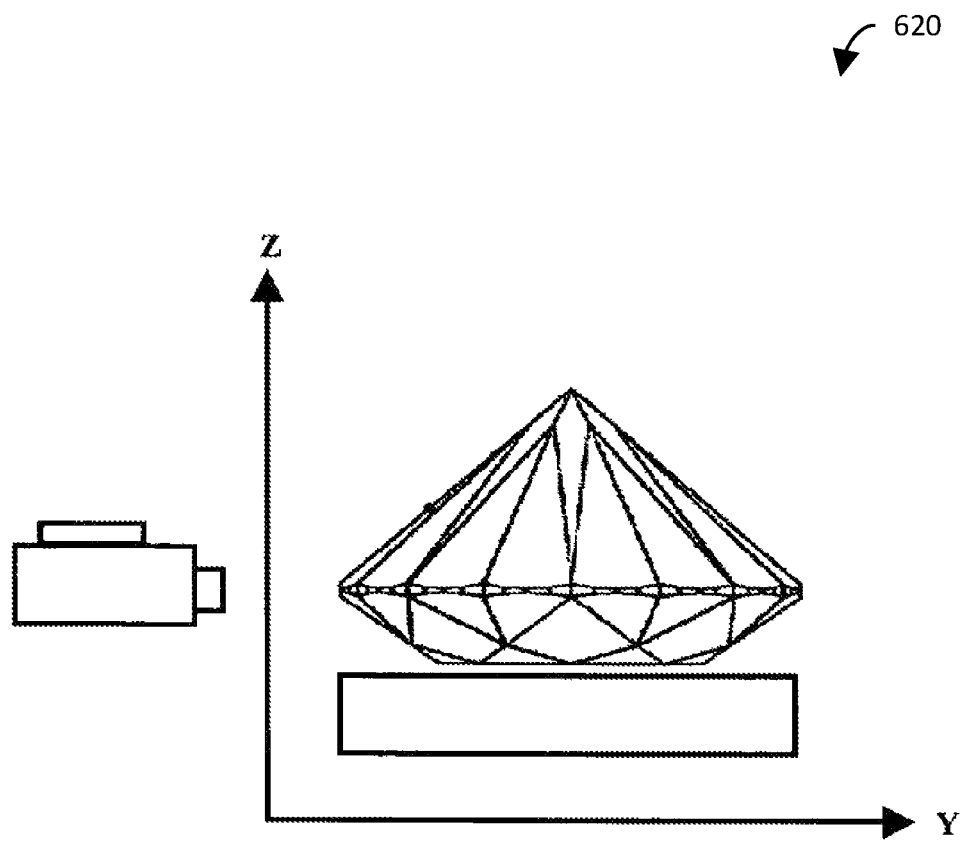
FIG. 6B illustrates the gemstone parameter instrument as a finished gemstone scanner.
Figure 6D:
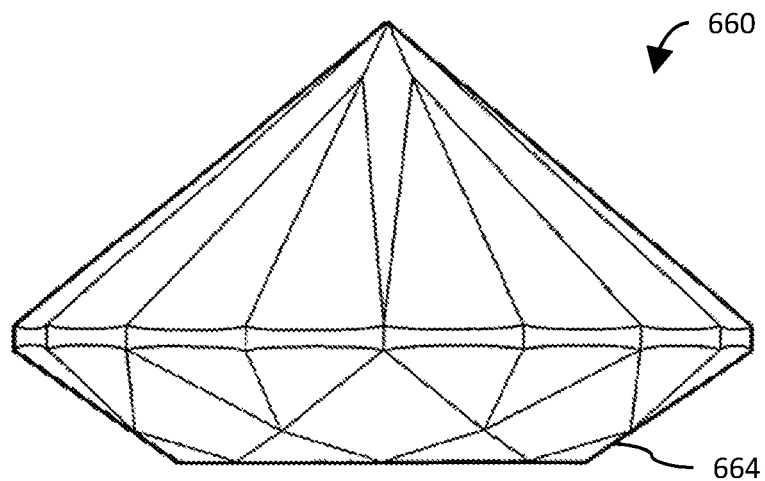
FIG. 6D illustrates the gemstone parameter instrument as a gemstone camera.
Figure 6D:
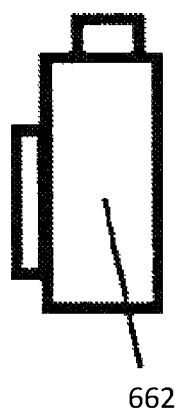

The gemstone parameter instrument 502 may be a highly accurate non-contact optical scanner that provides the gemstone parameters, for either a rough gemstone as shown in FIG. 6A or a cut gemstone as shown in FIG. 6B.

Figure 1:
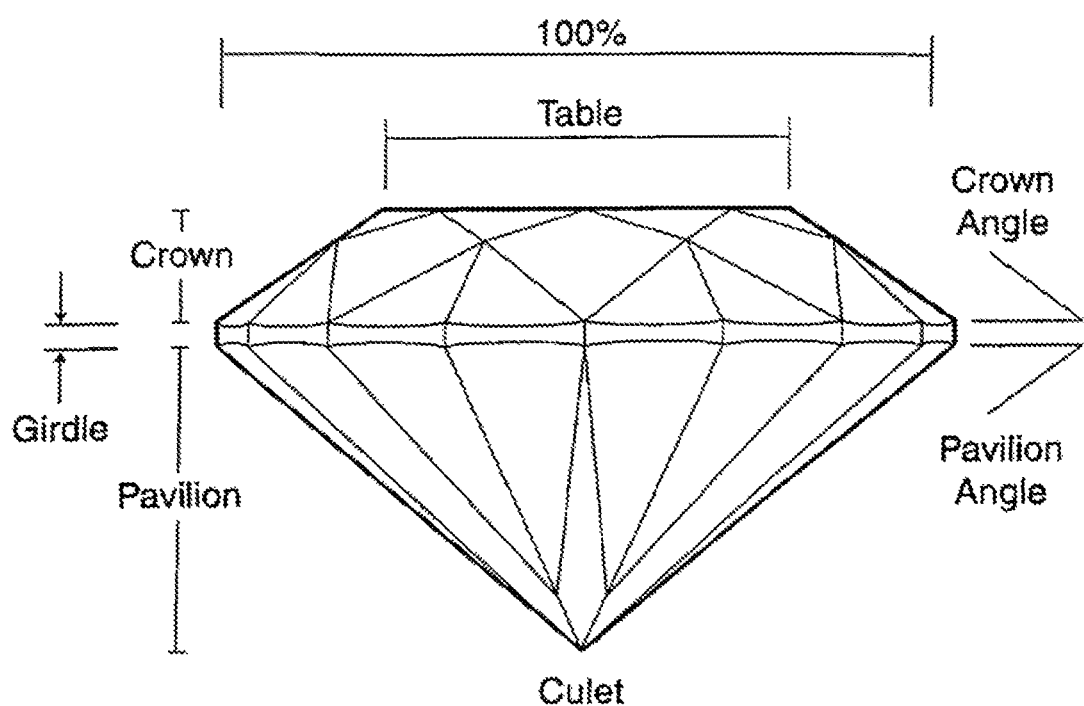
FIG. 1 illustrates gemstone parameters of a diamond.

FIG. 6A illustrates the gemstone parameter instrument 502 as a non-contact rough gemstone scanner 600, also known as a gemstone-scanning apparatus. FIG. 6A is adapted from FIG. 1 and FIG. 3 of U.S. Pat. No. 9,292,966, which is incorporated by reference for all purposes as if fully written in this document.

FIG. 6B illustrates the gemstone parameter instrument 502 as a finished gemstone scanner 620, also known as an apparatus for measuring a diamond. FIG. 6B is adapted from FIG. 10 of U.S. Pat. No. 7,259,839, which is incorporated by reference for all purposes as if fully written in this document.

The gemstone parameter instrument 502 may be a proportion measuring device that can measure and model every facet of a gemstone, creating a detailed model. With a detailed model of every facet it is possible to account for asymmetry and other facet. By using a detailed model the periphery light qualification system 500 may be able to determine at the qualified gemstone size rating with much higher accuracy. For example the detailed facet model may be used to produce virtual images of the gemstone in a particular lighting situation and from that virtual image the periphery light gauge may generate a qualified gemstone size rating.

Examples of proportion measuring devices, would be those manufactured by OctoNus-Lexus, Sarine Technologies and Ogi Corporation. For example, Sarine Technologies' desk-top measurement device that takes a series of 64 pictures of a rotating diamond and measures all angles and proportions digitally.

FIG. 6C illustrates the gemstone parameter instrument 502 as a gemstone parameter input form. The gemstone parameter input form may be an Application Program Interface, API where the data for the gemstone parameter input form may gather proportion information, for example like that provided in a digital format from GIA via its Report Check website facility. However one should note that the GIA proportion data has been rounded so it introduces slight inaccuracies, since it does not provide a model of the idiosyncrasies of each facet.

FIG. 6D illustrates the gemstone parameter instrument 502 as a gemstone camera system 660. Where the camera 662 takes a picture of the diamond 664 in a known lighting environment, like photos from photographic-video systems like DiBox 2. The photos could come from the images in a video. In these case the gemstone parameter may include the image of the diamond, and the knowledge of the distance of the camera from the diamond to be able to calculate at least one dimension of the girdle, or alternatively the gemstone parameter may include at least one dimension of the girdle, for example the diameter of a round cut gemstone, or the profile of the girdle, or the gemstone parameters provide a the top-view profile, i.e. the surface area of a plane through the girdle.

The gemstone camera system 662 may be a standardized reproducible photographic system that can take photographs of a gemstone in various consistent and known lighting conditions and maybe at various tilt angles. Where tilt angle is a small amount angle from viewing position perpendicular to a gemstone's table surface, for example, viewing perpendicular would have 0° tilt angle, and the tilt angle may be viewing from 2° from the perpendicular line. The tilt angle is a small of tilt, for example range 10° or less.

After the gemstone parameter instrument 502 gathers the gemstone parameters the system 500 may generate an image of the gemstone from the parameters, for example running ray tracing software on a virtual diamond of cut proportions from the gemstone parameters. Or the gemstone parameters may already include an image of the gemstone front face, or have a set of images of the front face at various tilt angles. In the case where the gemstone parameters contain an actual 3-D model that would provide the most detailed and accurate image to be used to determine the perimeter light score. Alternatively if the gemstone parameters only contain limited information for example crown angle Pavilion angle girdle thickness and table with then the system 500 may use an approximate 3D model for ray tracing analysis to use these numbers.

The periphery light gauge 504 quantifies the amount of light provided by the periphery of a gemstone. There are various ways the periphery light gauge 504 may accomplish its task of quantifying the periphery light, for example the periphery light gauge 504 may be a computer program that analyzes an image of a gemstone in a known lighting environment using a series of radially projecting lines and averages the outer 10% to 15% of the pixels along those lines to provide the quantified light score for each 360 radial lines, then the periphery light gauge 504 could average all the outer 10 to 15% of the 360 radial lines (see the below descriptions of FIGS. 7A, 7B and 7C). In another alternative the periphery light gauge 504 may measure the average light for the outer row or rows of facets. The periphery light gauge 504 may quantify the light relate the first outside row of facets or may quantified the first and second outside row of facets or three of the outside row of facets, or more than three of the outside row of facets. For example the description for FIG. 7D in determining the outside rows of facets. The periphery light gauge 504 may be a computer program that analyzes an image of the gemstone a using a doughnut shaped mask that averages the light provided by the periphery of the gemstone to arrive at a quantified light score (see the below descriptions of FIGS. 8A, 8B and 8C). Alternatively the periphery light gauge 504 may be a physical structure that blocks the light coming from the center of the diamond and only allows light coming from the periphery of the diamond and focuses it on a light sensor which provides the quantified light score.

Another way the periphery light gauge 504 may provide the qualified periphery light score may be to convert the peripheral 10% of pixels of the gemstone from an image in a known lighting environment into a gray scale number from 0 to 100% of light, add up all the pixels of the outer 10% and divide by the # of pixels to get the average where this average is the gemstone's raw-qualified-light. Then the periphery light gauge 504 may compare this raw-qualified-light to the same calculation for a picture of a reference gemstone in the same known lighting, where the total sum of the brightness, this is the reference raw-qualified-light. The system 500 may have summary information that holds the reference raw-qualified-light that corresponds to the various reference cut gemstones carat weights. The system 500 may find the reference raw-qualified-light that matches the gemstone-to-measure raw-qualified-light and provide that qualified gemstone size rating. The qualified gemstone size rating may be considered an apparent size, apparent carat weigh, a 'look like' size or 'looks like' carat weight. The qualified gemstone size rating may indicate the corresponding benchmark cut that would appear to be the same size as the gemstone under review. The qualified gemstone size rating may be relative and indicate if the diamond appears to be smaller or larger than the same weight benchmark carat gemstone.

The system 500 may produce reports that includes the gemstone size rating. The system 500 may use virtual models of the gemstone, created from the cut proportion information, where the cut proportion information may be included as part of the gemstone parameters.

The system 500 may provide a gemstone size rating. The gemstone size rating may have a corresponding comment. The system 500 may provide an example image. The system 500 may use the gemstone size rating to help determine the example image. The equivalent image may come from a photo taken of a real diamond with similar proportions (e.g. similar gemstone parameters) or generated using ray tracing modeling software and the gemstone parameters.

The system 500 may provide the gemstone size rating as an absolute gemstone size rating or a relative gemstone size rating. The absolute gemstone size rating may to the apparent size of the gemstone to the equivalent apparent size of a benchmark cut gemstone. The absolute gemstone size rating may provide a weight, so what the gemstone under consideration looks like. The relative gemstone size rating may be the apparent size of the gemstone relative to a benchmark cut gemstone of the same weight as the gemstone under consideration. So the absolute gemstone size rating may be the weight that it looks like, where the relative gemstone size rating may be the proportion bigger or smaller the gemstone looks like relative to the measured weight of the gemstone under consideration.

If the system 500 may provide the example image that is a photo of a real gemstone of a similar absolute gemstone size rating. The system 500 may have an inventory of pictures of real gemstones and their absolute gemstone size rating. The inventory of pictures may be stored in a database, a spreadsheet or some other formation and it may be accessible from the internet. The inventory of pictures may be searchable and the system 500 may be able to be rank the images in order, based on how close the diamond in the picture is to absolute gemstone size rating.

With the gemstone parameters gathered, the quantity of peripheral light may then be utilized to evaluate both the comparative relative gemstone spread, plus combining the apparent size (larger or smaller) with the measured spread to give an estimate of the apparent visual carat weight benchmark cut gemstone that has the same apparent visual size as the gemstone under consideration.

The gemstone size rating may be a grouping gemstone size rating scheme or may be a numeric gemstone size rating scheme. The relative gemstone size ratings may be a grouping scheme for example a four-grade or five-grade gemstone size rating scheme. The absolute gemstone size rating may be a numeric gemstone size rating scheme An example of five-grade relative gemstone size rating scheme may be 'smaller', 'small', 'average', 'big', and 'bigger'. Where the 'smaller' gemstones rating may be for gemstones that look more than 90% smaller than the size of the same weight benchmark cut gemstone. The 'Small' gemstone size rating may be for gemstones that look between 90% and 95% of the same weight benchmark cut gemstone. The 'Average' gemstone size rating may be for gemstones that look between 95% and 98% of the same weight benchmark cut gemstone. The 'Big' gemstone size rating may be for gemstones that look between 98% and 102% of the same weight benchmark cut gemstone. The 'Bigger' gemstone size rating may be for gemstones that look greater than 102% of the same weight benchmark cut gemstone.

An example of a four-grade relative gemstone size rating scheme may be 'very small, 'small', 'big', and 'bigger'. Where the 'very small' gemstones rating may be for gemstones that look 10% smaller than the size of the same weight benchmark cut gemstone. The 'Small' gemstone size rating may be for gemstones that look 5% to 10% smaller than same weight benchmark cut gemstone. The 'Big' gemstone size rating may be for gemstones that look between 5% smaller and 2% bigger than the same weight benchmark cut gemstone. The 'Bigger' gemstone size rating may be for gemstones that look greater than 2% bigger than the same weight benchmark cut gemstone.

An example of absolute numerical gemstone size rating scheme may provide the gemstone size rating as an equivalent weight gemstone. An relative numerical gemstone size rating scheme may be the percent bigger or smaller that the gemstone looks relative to the same weight benchmark cut gemstone. The numeric gemstone size rating scheme may be composed of two parts one representing the physical dimension of the girdle (either smaller or larger than the benchmark cut gemstone) and the other one being an adjustment for the light performance.

The periphery light gauge 504 may utilize a three-dimensional model of the gemstone and quantify the light that comes out the top of the gemstone from the periphery of the gemstone.

Figure 8A:
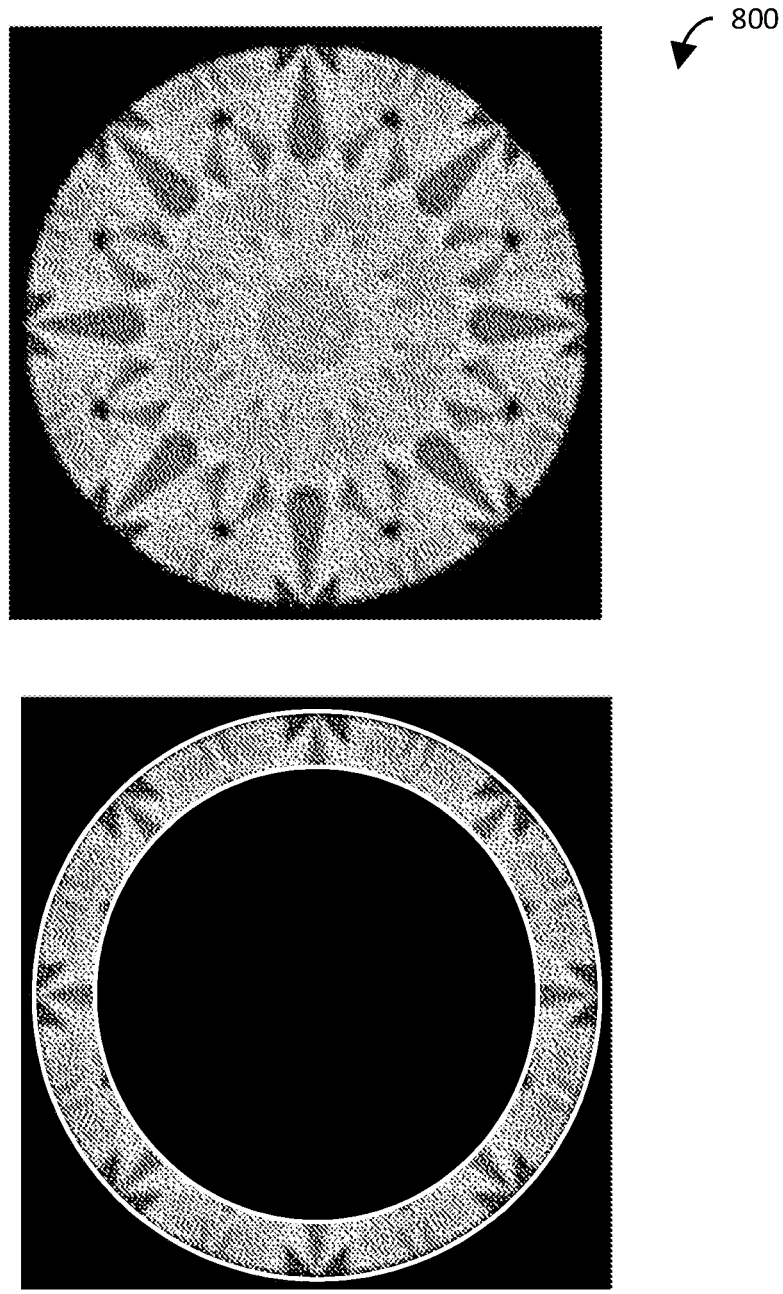
FIGS. 8A, 8B, and 8C show periphery light gauge using a doughnut shaped mask to arrive at the preferred light score.
Figure 8B:
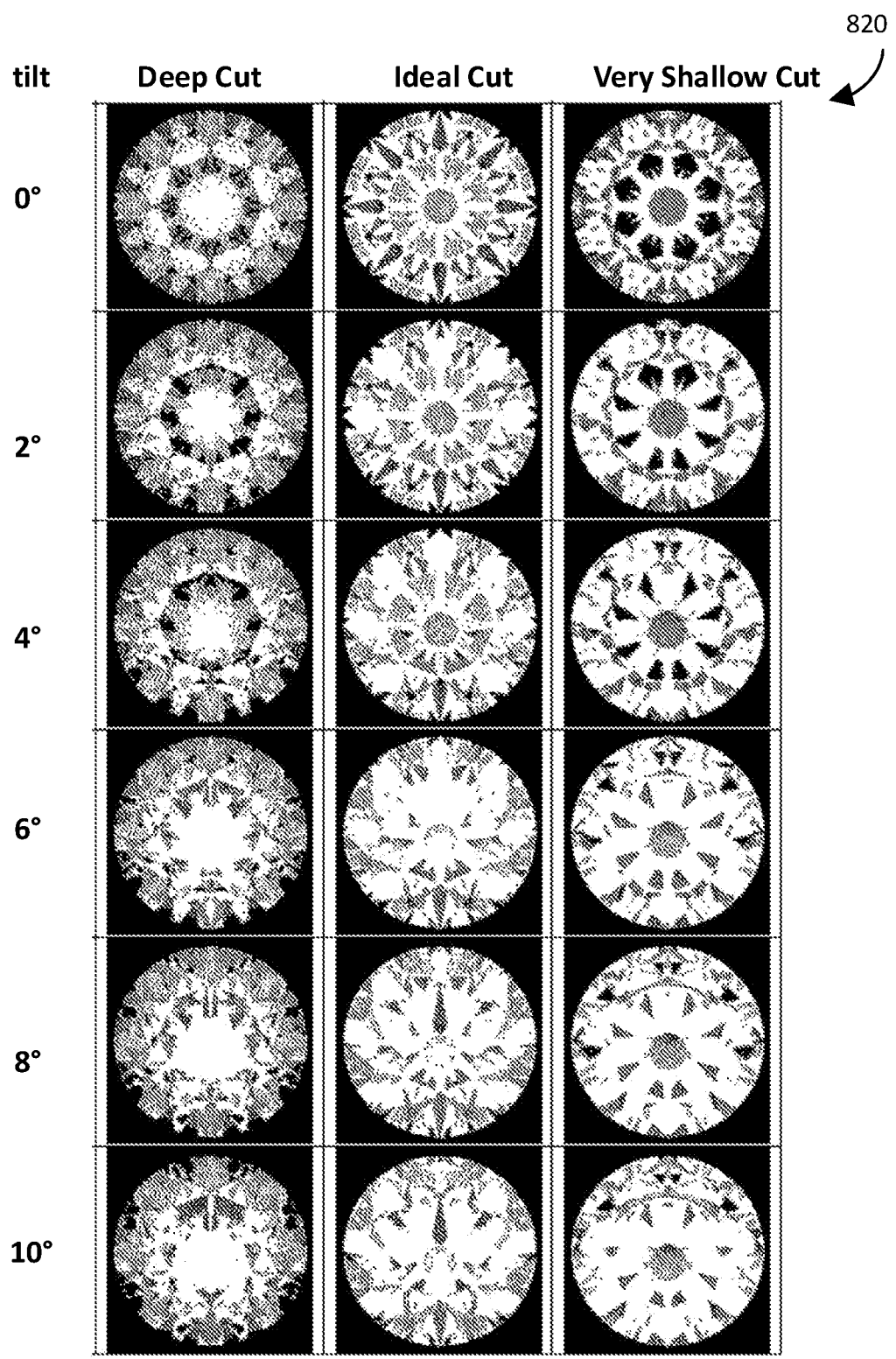

This raw-qualified-light may be calculated for a one image or taken as the average over several images where the gemstone is at various tilt angles, see FIG. 8B. Then the system 500 may compare the raw-qualified-light number to the same calculation the benchmark cut gemstone at the same tilt angles to arrive at a the gemstone size rating.

The periphery light gauge 504 may take the average gray in the outer 10% and multiply that by the total area to get the gemstone-to-measure raw-qualified-light. This gemstone-to-measure raw-qualified-light may be performed for several images where the gemstone is at various tilt angles. Then the system 500 may compare this raw-qualified-light number to the same calculations for a benchmark cut gemstone at the same tilt angles.

The periphery light gauge 504 may perform the same pixel counting as in either of the above two examples, but weight the outer edge brightness to count the most and as the system goes to the middle the multiply by the light by a reduction factor, where the reduction factor may go to zero at 20% on the way to the centroid. Alternately the reduction factor could us a Cosine weighted, value running from 100% at the outer edge to 0 at the 20% mark.

The periphery light gauge 504 may take into consideration that the gemstone is not perfectly shaped. For example, if a circular gemstone is off-round by a tiny amount, say 1%, and the number of pixels from the centroid to the outer edge is 500, then in the image that may have 5 pixels in question (1% of a 500 pixel radius is 5 pixels). If a peripheral ring is used that covers the outer 10% of the radius that would be 50 pixels. 5 pixels out of 50 is about 10%, which may be significant. The system 500 may avoid this problem by the use of an artificial mask background color, for example red. The differential background color should be one that doesn't appear naturally in the gemstone itself. The background color should not affect the generated image of the gemstone; if the image is generated by ray tracing software, then the software should not try to model a photo-realistic image of the stone as if it were in front of a red sheet. In this case the periphery light gauge 504 could skip counting the pixels that are of the artificial background color and the artificial background color may be used to determine the actual dimension of the top view of the gemstone.

In other words, this red background color should not be a part of the lighting. The ray tracing software may generate images in a lossless format such as PNG or BMP (JPEG is not preferred because it can do lossy compression), this way the image processing program may easily identify the background pixels and discard them. As a result, the system 500 may process the gemstone periphery right up to the edge, regardless of the shape of the stone or distortions because it can detect the edge based on the artificial background color. This may be particularly helpful analyzing images of a gemstone that is tilted to see how the peripheral light return of the gemstone changes as the gemstone is looked at from different angles. The tilted gemstones are not a perfect oval, as the software viewing position makes an oval on tilted gemstones because one part of the gemstone is closer to the virtual 'viewer' and the other part is further away.

With these gemstone parameters generated by a camera 662 the periphery light gauge 504 may use the image along with the other gemstone parameters to determine the quantity of peripheral light.

Similarly, gemstones are rarely perfectly round. So if a round or oval mask is used parts will have the black background and parts of the real edge will be missed.

The qualifier 506 may use the gemstone parameters and the qualified periphery light score to determine a qualified gemstone size rating. This is particularly useful for accuracy when information in the gemstone parameters includes details of every facet or inclusions in the gemstone or a picture of the actual gemstone.

In order to create and validate the qualifier 506 accurately assign a qualified gemstone size rating various methods may be used. Several methods for creating the qualifier are described here but there are other possible methods beyond what is detailed in this document.

The qualifier 506 produces a quantified gemstone size. One way the qualified gemstone rating may be arrived at is starting with the measured carat weight and adjusted to qualified gemstone rating so it reports what the gemstone under study will look like relative to what a benchmark cut gemstone would look like. The qualified gemstone size rating may be adjusted by two factors first based on the actual face-up size the surface area of the gemstone in, the girdle plane (the physical dimension) and second qualified gemstone size rating may be adjusted based on the periphery light score. The intent of the qualified gemstone size rating is to be the same as that would have the same benchmark that looks like the same size. For example, the lighting condition when the gemstone is set in a ring or jewelry. The periphery light quantification system provides a quantification that an individual may use to help inform their own opinion as to the desirability of the gemstone.

The system 500 when determining a qualified gemstone size rating for a particular cut gemstone may use qualified gemstone size rating from summary information generated and gathered previously. An additional number may be interpolated from a known data which calculates the numerical plus or minus data that may be multiplied or divided with the relative size information of a particular cut gemstone comparative measured size. In this regard the gemstone qualification system provides a qualified gemstone size rating The system 500 may use a computer that may have a processor, a memory, a display control subsystem, an input subsystem and a communication subsystem.

The processor may execute machine-readable instructions. The processor may execute the instructions on one or more virtual or physical electronic processing devices. For example, the processor may execute instructions to perform steps and processes described in this document. The processor may include one or more processors to execute the machine-readable instructions.

The memory may include computer-readable medium that contains instructions that the processor can execute. The computer-readable medium (also referred to as a processor-readable medium) may include any non-transitory ephemeral (like not radio waves), or tangible medium that participates in providing data (e.g., instructions) that may be read by the processor of the computing device. Such a medium may take many forms, including, but not limited to, non-volatile media and volatile media. Non-volatile media may include, for example, optical or magnetic disks, solid-state memory, a floppy disk, a flexible disk, a hard disk, a magnetic tape, any other magnetic medium, a CD, a CD-ROM, a DVD, any other optical medium, punch cards, paper tape, any other physical medium with patterns of holes, ROM (Read Only Memory), a PROM (Programmable Read Only Memory), an EPROM (Erasable Programmable Read Only Memory), a FLASH-EPROM, a USB drive (e.g. Thumb Drive), SD cards, any other memory chip or cartridge, other persistent memory, or any other medium from which a computer can read. Volatile media may include, for example, include RAM (Random Access Memory) like static random access memory (SRAM) or dynamic random access memory (DRAM), which typically constitutes a main memory.

The memory may hold the items described in this document for example the media, the playlists, related information and computer executable instructions.

The display control subsystem 206 may facility displaying the media by sending signals to the display screen. The computing device may provide an integrated display control subsystem, memory, and processor such that computing device executes machine readable media to provide the methods described in this document.

The communication subsystem may allow execution of the methods described in this document over the network. For example, the communication subsystem may enable the computing device to communicate with a plurality of personal computing devices running the web-apps or one or more servers.

The communications subsystem may receive computer instructions for the processor, and those instructions may be stored in the memory.

The communication subsystem may communicate with the network by one or more transmission media, including wired (coaxial cables, copper wire and fiber optics, including the wires that comprise a system bus coupled to a processor of the computing device) or wireless.

The communication subsystem may be equipped to communicate over many technologies that may be part of the network. For example, the communication subsystem may be equipped with a WiFi module that connects to mobile hotspots (via WiFi) which may connect to the internet. Wireless communication may include a cellular wireless network, Wi-Fi communications network, a wired Ethernet network, or any communication means that facilitate networked communication with other computing devices. In addition, the communication subsystem may be capable of communicating via any number of short-range wireless technologies for example Bluetooth, Near Field Communication (NFC), ZigBee, infrared, Wide Area Network (WAN), etc.

In general, the processor may receive instructions, for example from the memory and executes those instructions, thereby performing the functions described in this document. Such instructions and other data may be stored and transmitted using a variety of computer-readable media.

The network may include the internet, or may include some other computer network composed of wired and wireless technology. The wired technology may include electrical wire (for example, Ethernet, HomePNA, power line communication, G.hn etc.), optical fiber (fiber-optic communication) or other physically connected communication technology. The wireless technology may include using radio waves (wireless networking such as WiFi, 802.11, Bluetooth, WiMax etc.), microwaves or other electromagnetic waves.

Figure 7A:
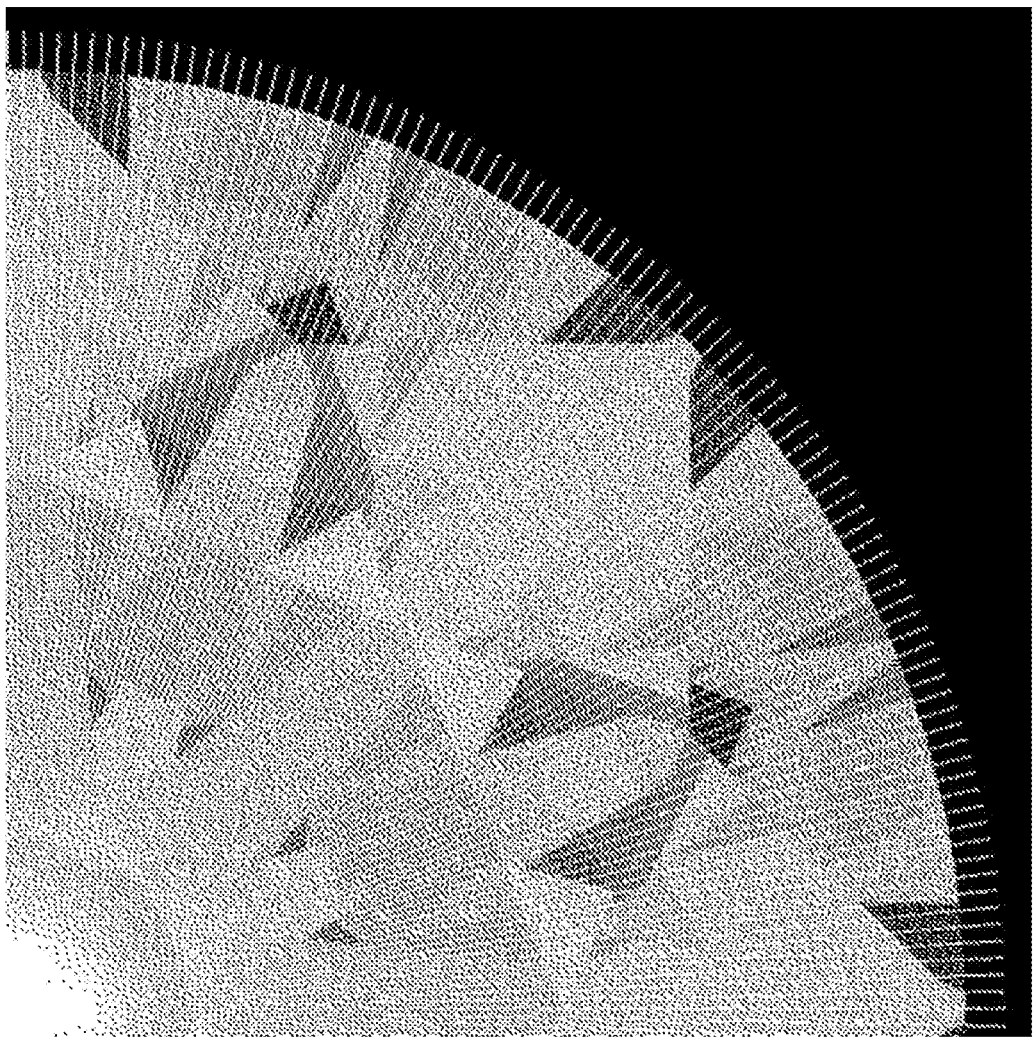
FIGS. 7A, 7B, and 7C show how the periphery light gauge may use 360 radial lines to arrive at a periphery light score.
Figure 7B:
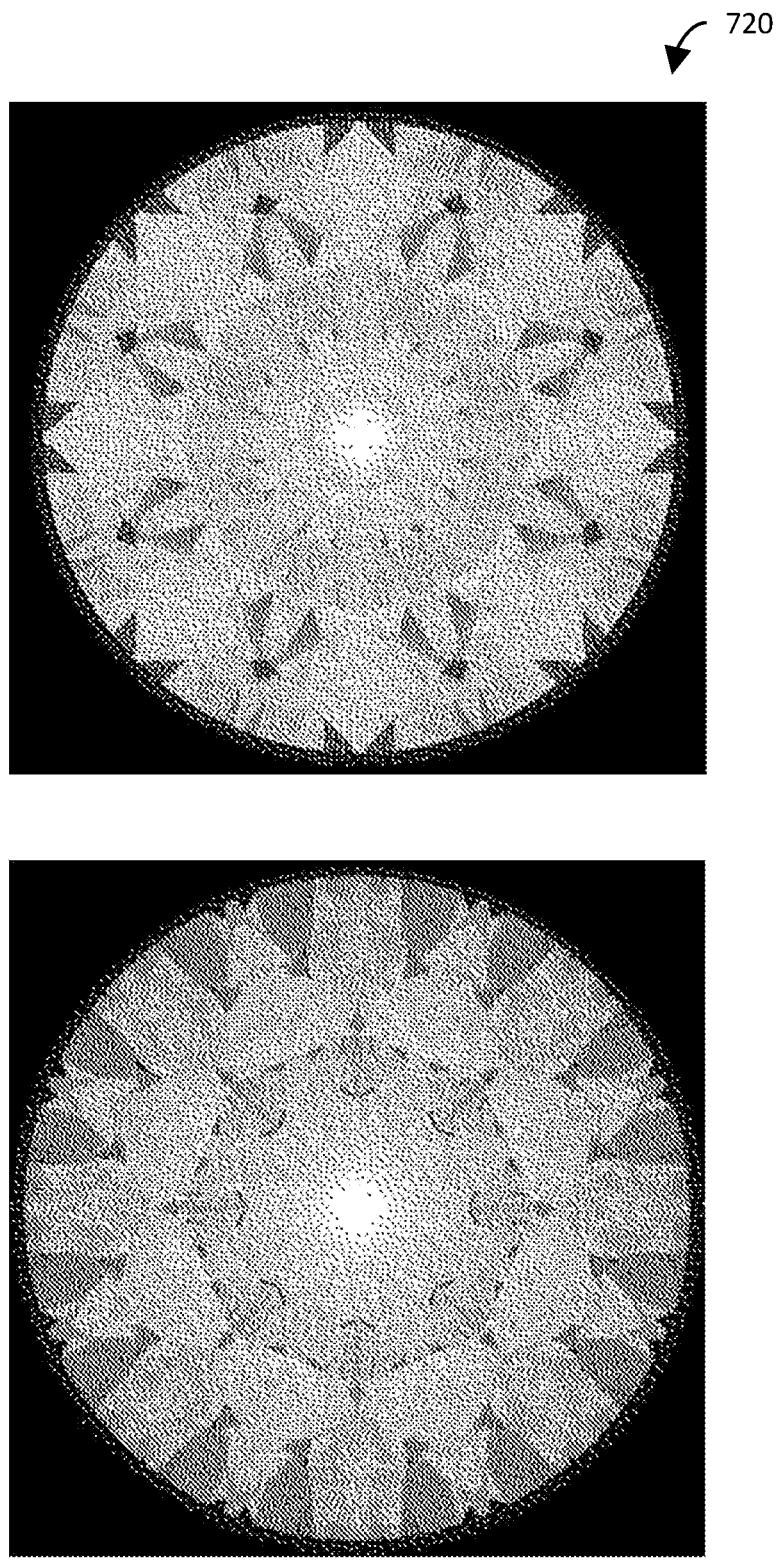
Figure 7C:
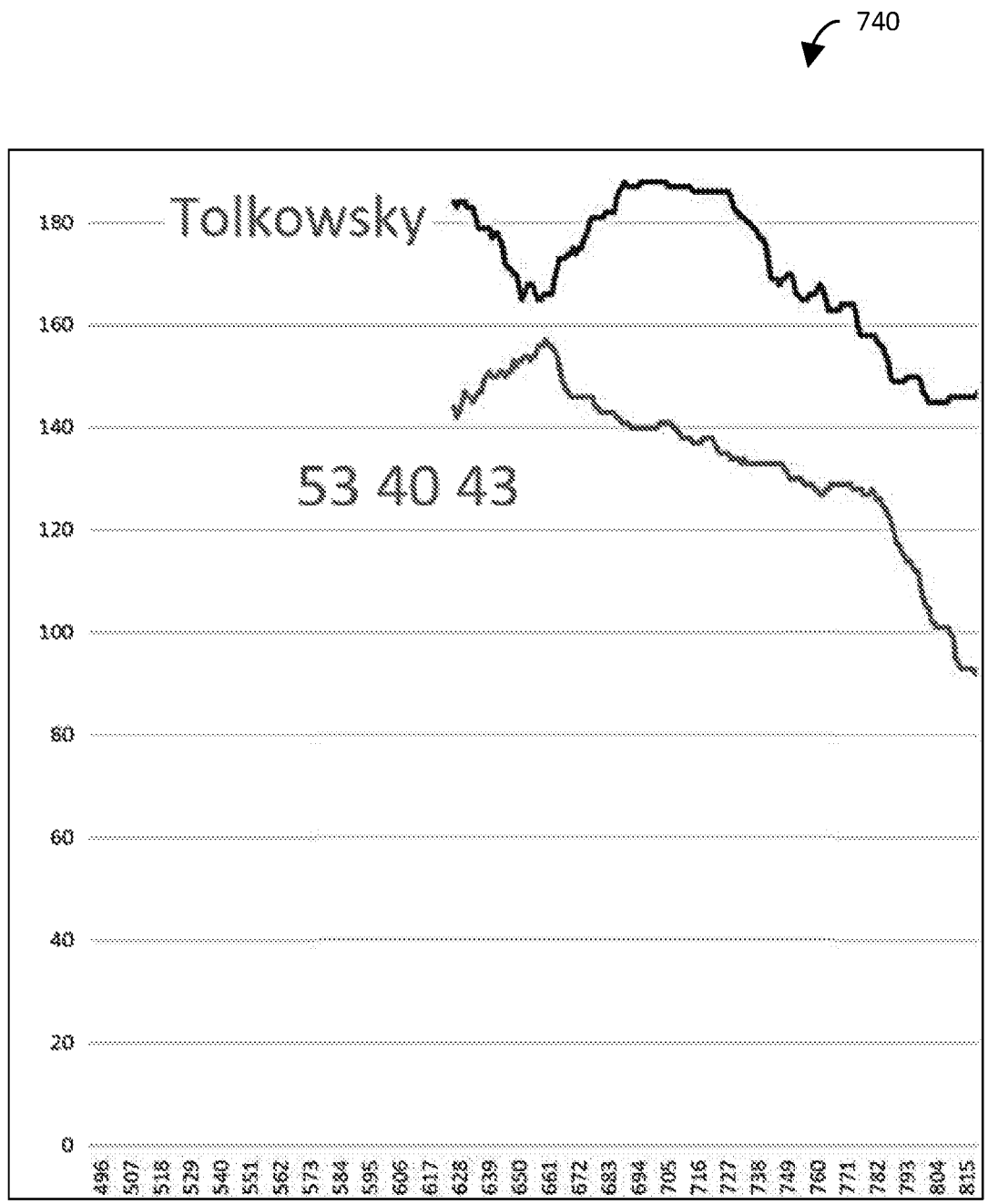

FIGS. 7A, 7B, and 7C show one way the periphery light gauge 504 may arrive at a periphery light score using 360 radial lines.

FIGS. 7A, 7B and 7C illustrate one approach for the periphery light gauge 504. Starting with a top up image of gemstone in a known lighting environment the method to measure or estimate periphery light score. For example, the image may be generated using are ray tracing with known cosine lighting. First looking at the lines of images may be constructed along 360 lines radiating and have had averaged radial computations performed on the outer 15% of a line radiating from the centroid of the cross section. Or instead of the outer 15% it may be the outer 5% or outer 15%. The outer 5% may be weighted more in the 5% to 10% may be made lass and the last 10% to 15% maybe we lower still. For example, the outer 5% may be weighted 3/5, the 5% to 10% may be weighted 2/5 and the 10% to 15% may be weighted 1/5.

The average pixel gray scale may be calculated on 360 radial lines were computed computations were conducted on images as shown on the FIG. 7A.

Figure 7D:
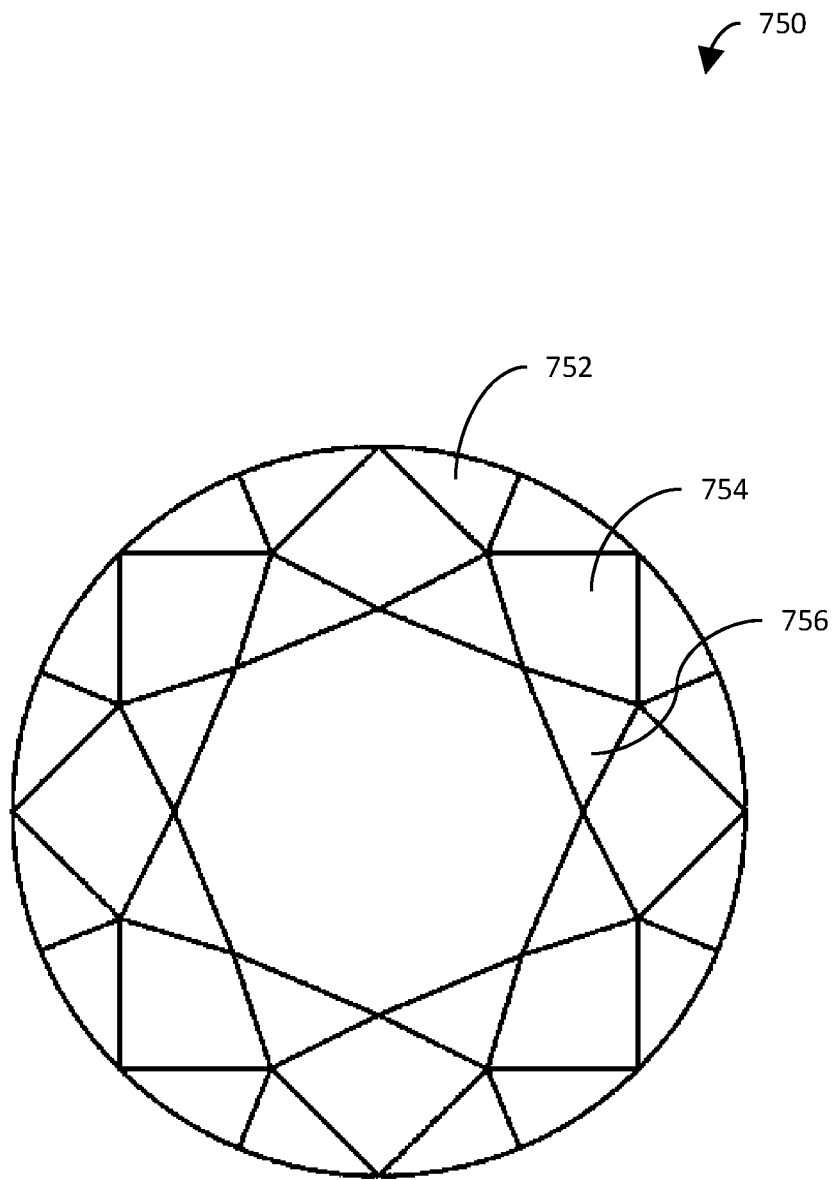
FIG. 7D show how the periphery light gauge may use the outer rows of facets to quantify the periphery light score.

FIG. 7D illustrates the facets on a round brilliant cut diamond 750 and how the two outer rows would be determined. The first are those that have an edge on the outer perimeter, example second row facet 752. The next row of facets, the second row, are those facets, not in the first row that share an edge with facets in the first row, example second row facet 754. The facets that are not in the first two rows and shared an edge with a facet in the previous row.

The system may arrive at a periphery light score by computing the light return from the outer rows of facets of a gemstone. It may be desirable to weight the results, for example the 2nd row may be the facets to measure and compare the average pixel darkness/lightness. There may be more weight given to the outer facet row and less to the next facet row. For example, the outer role may be given more weight than the second row and the third row may not contribute to the peripheral light score. So the outer facet row may contribute 67% and the second row 33%.

Figure 8C:
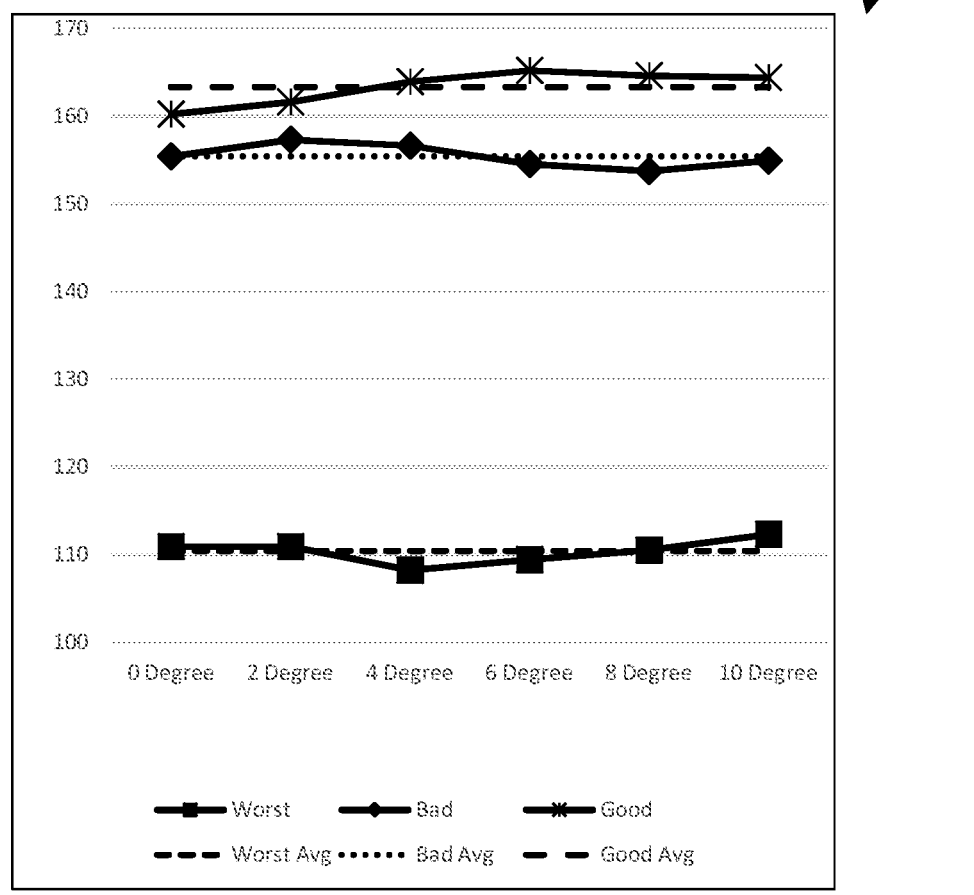

FIGS. 8A, 8B, and 8C are related to a doughnut mask periphery light gauge 504 algorithm that maybe used to arrive at a qualified light score using a doughnut shaped mask.

The periphery light qualification system 500 the functionality of the periphery light gauge 504 may not be necessary to analyze the periphery light performance at the time the gemstone parameters are provided. Instead the periphery light qualification system 500 may be able to do the peripheral light analysis for a known set of gemstone parameters to arrive at the qualified gemstone size rating, and any set of gemstone parameters not already pre-calculated the periphery light qualification system 500 may produce the qualified gemstone size rating by interpolating from the set of gemstone parameters for which the analysis has been done to provide the qualified gemstone size rating. This summary approach is expected to be useful in cases where the provided gemstone parameters provide course dimensions regarding the gemstone, for example in the case of a circular cut diamond the average crown angle, average pavilion angle, the size of the table and the girdle diameter and thickness. Using the summarized information the qualifier 506 may utilize the summarized information derived from the periphery light gauge 504 to use the gemstone parameters with the summary information that is based on the periphery light performance to arrive at the qualified gemstone size rating.

As mentioned a factor affecting the apparent size of a diamond is the light return from the edges of a gemstone, especially for a transparent colorless gemstone such as a diamond. If a gemstone has reduced periphery light a result of leakage the diamond can appear smaller than its actual physical face dimension-based size as shown in FIGS. 2A, 2B and 2C. This apparent size could be considered analogous to the relationship between temperature and wind chill. As is well know if the temperature is 32° F. (0° C.), but it is very windy, it may feel like 10° F. (−12° C.). Quantifying the apparent size problem may be done similar to the relationship between temperature and wind chill, with a relationship of carat weight to apparent size of a gemstone based on its optical performance from the gemstones cut proportions.

Spread is a term to describe the surface area of the top of a gem. Spread can be reported in square millimeters.

A relative spread of a cut gemstones can be defined by the spread of the diamond compared to the spread of a known benchmark. For consistency a single benchmark may be used for comparison of all cut shapes and types. Alternatively, there could be a different benchmark for each type of cut, also known as classification of cut, for example round, princess, emerald, asscher, marquise, oval, radiant, pear, heart, cushion etc. Cuts other than round brilliant are also known as fancy cuts. One way to report the relative spread may to compere to a benchmark the reporting an apparent carat difference that maybe approximated using the following formula:

$$S_{ct} = C_b \frac{VE}{VE_b} - C \qquad (1a)$$

Where: $S_{ct}$=relative spread weight, for example in relative spread carat weight, reports how much the cut gemstone appears to differ from the benchmark cut in weight (e.g. carat weight)

VE=Volume Estimate of the cut gemstone based on the gemstone top-view surface area or spread or face for example in mm$^3$ $VE_b$=Volume Estimate of the benchmark cut gemstone, for example in mm$^3$ C=weight of diamond under consideration, for example in carats $C_b$=weight of Benchmark diamond for equivalent benchmark of the same spread, for example in carats For a round cut the Volume Estimate VE may be D$^3$ where D is the Diameter of the face of the round cut gemstone. Substituting D$^3$ for VE and substituting $D_b^3$ for $VE_b$, where $D_b$ is the Diameter of the Benchmark, and simplifying we get:

$$S_{ct} = C_b \left(\frac{D}{D_b}\right)^3 - C \qquad (1b)$$

Where: $S_{ct}$=as defined above

D=diameter of diamond under consideration, for example in millimeters

C=weight of the gemstone under consideration, for example in carats $C_b$=weight of Benchmark gemstone, for example in carats $D_b$=a constant in millimeters diameter of the benchmark gemstone.

Considering a benchmark of the common practical variant of the Tolkowsky round brilliant cut 1.00 ct diamond with a table size of 57% of the average diameter and a 3.5% average girdle thickness that results in a diameter of 6.44 millimeters, gives rise to the following formula:

$$S_{ct} = 1.00 \left(\frac{D}{6.44}\right)^3 - C \qquad (1c)$$

Simplifying yields $$S_{ct} = \left(\frac{D}{6.44}\right)^3 - C \qquad (1d)$$

Where the variables are as defined above.

The relationship between expected volume and thus weight is a cubed relationship. Taking the diameter corresponding to a 1 carat gemstone and cubing it one can get an estimated weight based on the volume and gemstones density, i.e. weight per volume. Maintaining the benchmark proportions perfectly as the gemstone gets bigger then as weight goes up the estimated weight based on volume would go up by the same percent. Multiplying 1.00 by the inverse of the other a constant, namely 1.0, then any deviation from 1 that would indicate the volume estimate is off from the actual weight meaning the diamond under consideration has deviated from the benchmark cut proportions. Subtract the ratio from 1 and multiply by 100 gets the spread percent, that is how much based on a % basis the gemstone under question appears relative to what it should be if it had been cut perfectly to the benchmark:

$$S_{pct} = 100 * \left(1 - C * \left(\frac{D}{D_b}\right)^3 C_b\right) \qquad (2a)$$

Where: $Sp_{ct}$=Spread Percentage, that is how much on a % basis the gemstone's apparent size is relative to its weight if the gemstone were cut perfectly to the benchmark cut Considering again the common practical variant of the Tolkowsky round brilliant cut 1.00 carat gives rise to the following formula:

$$S_{pct} = 100 * \left(1 - C * \left(\frac{6.44}{D}\right)^3 * 1.0\right) \qquad (2b)$$

$$S_{pct} = 100 * \left(1 - C * \left(\frac{6.44}{D}\right)^3\right) \qquad (2c)$$

This spread percentage may be used as the adjustment based on physical dimension to the qualified gemstone size rating.

An example of this testing was done for a diamond with a carat weight of 0.53 carat D color and VS1 clarity. The diamond had GIA Excellent Cut proportions with a 55% table, a pavilion angle of 41.8°, a crown angle of 34°, and a 3% girdle thickness and measured 5.14 by 5.20 mm, which using the above formula, says the actual weight equivalent for a perfect Tolkowsky benchmark cut would be of a 0.515 carat diamond.

The brilliance of a cut gemstone should maximize light return through the top of the diamond. By maximizing light returned a cut gemstone has more brilliance and appears larger than gemstones with a poorer cut.

Diamond experts generally consider Brilliance to be the most important feature when considering the beauty of a diamond. If a gemstone is cut such that more light is lost out the pavilion (i.e. bottom facets) the brilliance of a gemstone is reduced. The light that enters the table of a well cut gemstone, i.e. well-proportioned gemstone, largely leaves via the crown (i.e. top facets), and vice-a-versa, light entering the crown (i.e. top facets) tends to leave via the table. A fuller understanding of brilliance should include the directions in which light travels to an observer and the source and types of light available. When ambient lighting is low, the apparent size difference of gemstones such as diamonds with different brilliance becomes more apparent.

A software based approach is to measure the darkness or brightness of pixels from the edges of a gemstone or diamond. This method may be applied to actual standardized gemstones or diamond photos, or software generated images form known proportions entered into ray tracing software and used to generate images, or from accurate 3 dimensional scans by non-contact photographic measurement devices such as those produced by Sarine™, OGI™ and Helium™. Outputs from the non-contact devices can be provided as 3D data in computer files, for example in STereoLithography format originating from 3D Systems (often found in files with the ".stl" extension), 3D point files (like those often found in files with the ".asc" extension) or other 3D file formats Ray tracing software can produce images of gemstones. Alternatively, scanning devices may incorporate the peripheral light qualification system to directly make computations and provide the qualified gemstone size rating.

Figure 9:
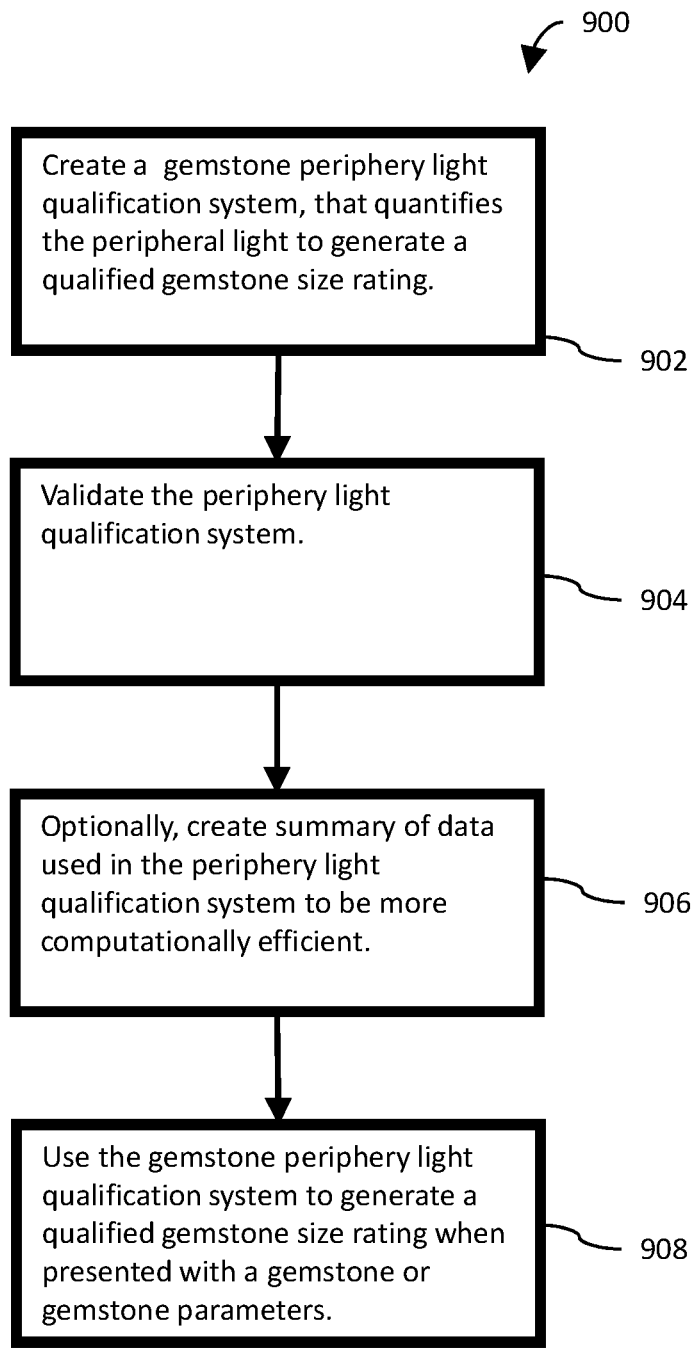
FIG. 9 illustrates a flowchart of how to create and validate a periphery light qualification system 500.

FIG. 9 illustrates a flowchart of a process 900 that shows how to create and validate a periphery light qualification system 500. The process 900 starts at box 902, where a detailed periphery light qualification system 500 is constructed. The construction may involve creating physical devices, sensors and software that runs on a general-purpose computer, as described above.

Next the process 900 continues at box 904 where the periphery light qualification system 500 constructed at box 902 may be validated. Since the system uses objective measures to represent the qualified gemstone size rating which is intended to include the subjective portion of human perception the system may be validated that the objective numbers provided by the gemstone periphery light qualification system 500 produces results that agree with people's observations of the apparent size of the gemstone.

Next after the validation is complete at box 904 the process 900 optionally creates a summary of the calculations used to produce the qualified gemstone size rating. This optional step allows for more efficient use of computational resources because it runs the calculations for gemstone parameters once and stores the results in summary form. In this form of the gemstone periphery light qualification system 500 when presented with the parameters of a gemstone the system 500 may consult the summary information to determine a qualified gemstone size rating an may avoid the more computationally intensive process of using ray trace or pixel counting/averaging of the peripheral light.

In such an implementation of the system 500 it is possible to visually estimate or use software programs to detect grayscale boundaries and the light coming from the edges of gemstones of various proportions. By knowing the edge brightness, also known as the periphery light score, of gemstones with various proportions, one can estimate the diameter of the edges of the light return area, i.e. the periphery light score. Thus the periphery light score of many diamond images may be calculated and used to populate a lookup chart or charts. For gemstones with proportions in-between the chosen parameters variations between neighboring variants the system 500 may estimate the qualified gemstone size rating. The estimated qualified gemstone size rating may use a linear interpolation to provide the qualified gemstone size rating.

The system may estimate the periphery light score at various tilted angles of the gemstone as shown in FIG. 8.

Finally, the process 900 is at box 908 and the gemstone periphery light qualification system 500 is ready for use. Presenting the system 500 with the parameters for a gemstone the system 500 may provide a qualified gemstone size rating.

Figure 10:
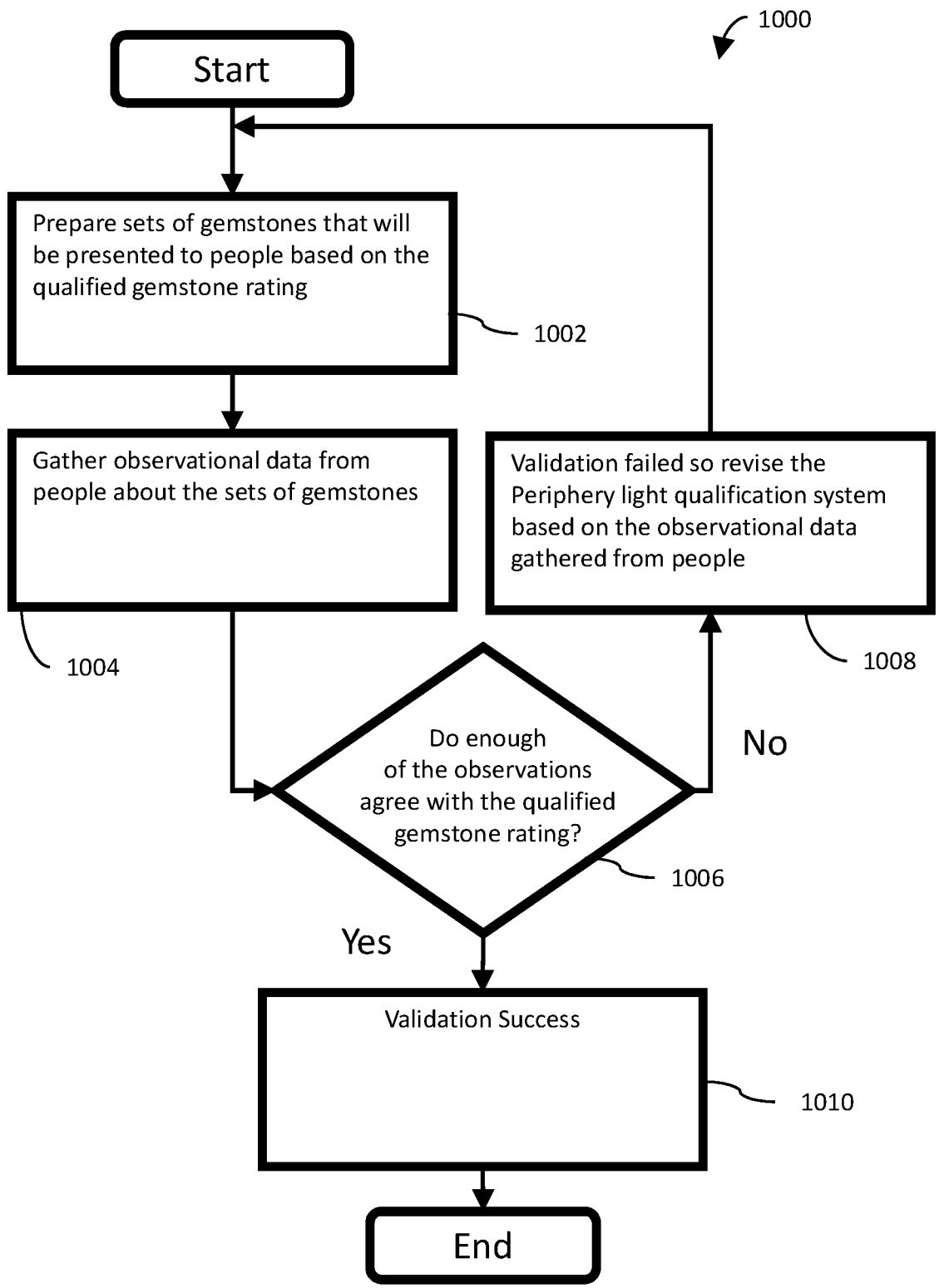
FIG. 10 illustrates a flowchart of a validation method that for a periphery light qualification system.

FIG. 10 illustrates one possible implementation of box 904 "Validate the periphery light qualification system," a flowchart validation process 1000 that one may use to validate a periphery light qualification system 500.

The process 1000 begins at box 1002 where the process 1000 may create sets of gemstones, for example matched pairs. The first gemstone in the matched pair would be a gemstone that does not share the benchmark proportions. The process 1000 may have the gemstone periphery light qualification system 500 produce a qualified gemstone size rating for the first gemstone based on the first gemstone's parameters. The second gemstone in the set would be gemstone of the benchmark cut with the same qualified gemstone size rating. Thus, the process 1000 has used the qualified gemstone size rating from the periphery light qualification system 500 to created objective matches between non-benchmark cut gemstones and benchmark cut gemstones.

The process 1000 may ensure the sets of diamonds prepared in box 1002 cover a range of variations from the benchmark cut for example various asymmetries ranging from excellent to good and a range of facets alignments ranging from fair to poor.

The process 1000 may continue at block 1004 were subjective data may be gathered from people about the sets of gemstones. The process 1000 may present the sets of gemstones to people and the process 1000 may gather their opinion, for example for match pairs gather options if the gemstones appear to be the same size. The number of observations may vary, for example for the initial feedback the process 1000 may gather ten observations about ten sets of diamonds. The process 1000 may gathering may gather a more statistically significant set of observations.

In order to verify that the qualified gemstone size rating is accurate a validation process may be performed by comparing real gemstones with proportions that very from the benchmark cut, for specific carat weights to diameters cut to benchmark proportions, but of different weights or dimensions. Comparing estimates of the qualified gemstone size rating with real diamonds cut to benchmark proportions enables one to validate that the system 500, is providing qualified gemstone size rating to be validated. If the during the validation process 1000 qualified gemstone size rating is not found to match the corresponding benchmark proportion gemstone, then the proposed peripheral light qualification system 500 can be adjusted to better correlate. This validation process can be continued until the subjective measure show the qualified gemstone size rating to be an accurate reflection of the perceived gemstone size.

As can be seen in FIGS. 2A, 2B and 2C, different lighting and backgrounds can result in different apparent sizes. Diamond experts know that viewing gemstones in low lighting apparent size differences are more noticeable when. As such, gathering of subjective data may include gathering observations in a range of lighting conditions and may include low lighting conditions. The process 1000 may, after testing tens or hundreds of gemstone size ratings and finding close correlations, a high degree of correlation and confidence may be established.

This testing of estimated results can be confirmed by showing actual diamonds with known dimensions, carat weights and proportions to numerous observers in various lighting environments. The real diamonds were scanned with a Helium non-contact scanner to build an actual 3D model of the diamond enabling the same ray trace system generated images (for example using cosine lighting) to be produced, but also accounting for symmetry and other deviations that are not present in the purely modeled diamonds used as the basis of look up charts.

A more efficient method, now available with the advent of virtual diamond analysis use ray tracing software is to create computerized virtual models of various cuts gemstones. One advantage of using ray tracing virtual diamond analysis is the elimination of problems relating to the variation in color and clarity that exist in the real diamond.

Such ray tracing software programs may be used to develop charts of diamond images of the most commonly encountered diamond proportions. See FIG. 6. For the present example, the range chosen was for the same system as U.S. Pat. No. 7,251,619. Several table size charts in 1% increments between 53% and 65% with rows and columns of images with pavilion angles between 39.5° and 43° in 0.5° gradations and steps of one degree for crown angles between 28° and 40°. The images can be generated for known lighting conditions, for example cosine lighting, or perimeter lighting.

Cosine lighting is a computer generated lighting environment that can be used by ray tracing programs. In cosine lighting the light from the observation point has light from directly above the diamond' face is full brightness and has a value of 1.0 and light from the side, i.e. the horizon, has a value of zero. The amount of light varies as a cosine of the angle from 0° (straight up) brightest with light value of 1, to 90° (the horizon) dark with a light value 0. In cosine lighting light leakage appears to be dark as there is no light sourced from below the gemstone's girdle or edges. In cosine lighting, there may be an obstruction zone that models an observers head as a black circle obscuring 19° of the 180° hemisphere. The ray tracing software lighting model may have dispersion turned off to reduce distractions.

The system 500 may utilize ray tracing software to model perimeter lighting in red, and bottom lighting is while, and thus the top view of the diamond shows red or pink when light from above is returned to a potential observer, and white is returned when light has emanated from below the gemstone girdle. Perimeter lighting can be provided by devices that are a small cylinder or cone shape that is opened on one end to place over a diamond sitting in a recess with white back light. the opposite end of the cylinder or cone is the observer end, that a person places there eye up to look at the top of the diamond Perimeter lighting can be provided by products such as Ideal-Scope™.

The process 1000 will decide at decision diamond 1006 whether observations agree with the system 500 produced quantified gemstone size. If no then then the process 1000 continues at box 1008. If yes then the process 1000 finishes at box 1010.

At box 1008 the periphery light quantification system 500 is revised so that it produces improved quantified gemstone size results that are more consistent with these objective observations gathered at block 1004.

For example in this case where a set was shown to 15 people with 3 other diamonds of 0.52 ct of 5.17 mm, 0.47 ct of 4.97 mm and 0.44 ct of 4.89 mm and a question was asked: "Which of these three diamonds makes the best size or diameter match with the center diamond?"

One person chose the 0.44 ct smallest stone, 12 chose the 0.47 ct and two chose the largest 0.53 ct diamond. Therefore the 0.53 ct diamond appears to be 5.00 mm diameter which looks like 0.475 ct. Using this data the gemstone periphery light qualification system 500 can be checked to ensure that the qualified gemstone size rating for these gemstones produce the same number.

It is likely that in the case example above that many people would prefer to have a diamond that weighs more than half a carat, and the current grading systems makes such diamonds available, as this measured physical size of the diamonds is within the well accepted diameter for a half carat diamond. However, because of the current grading systems the cutters will not choose to cut a diamond in the size range of 0.45 to 0.49 carat even though it may be a better performing diamond. Informed consumers and retailers of gemstones, such as diamonds, know that the apparent size is important, but without a system 500 to produce consistent and repeatable quantified gemstone size numbers such information it has never been available.

Figure 11:
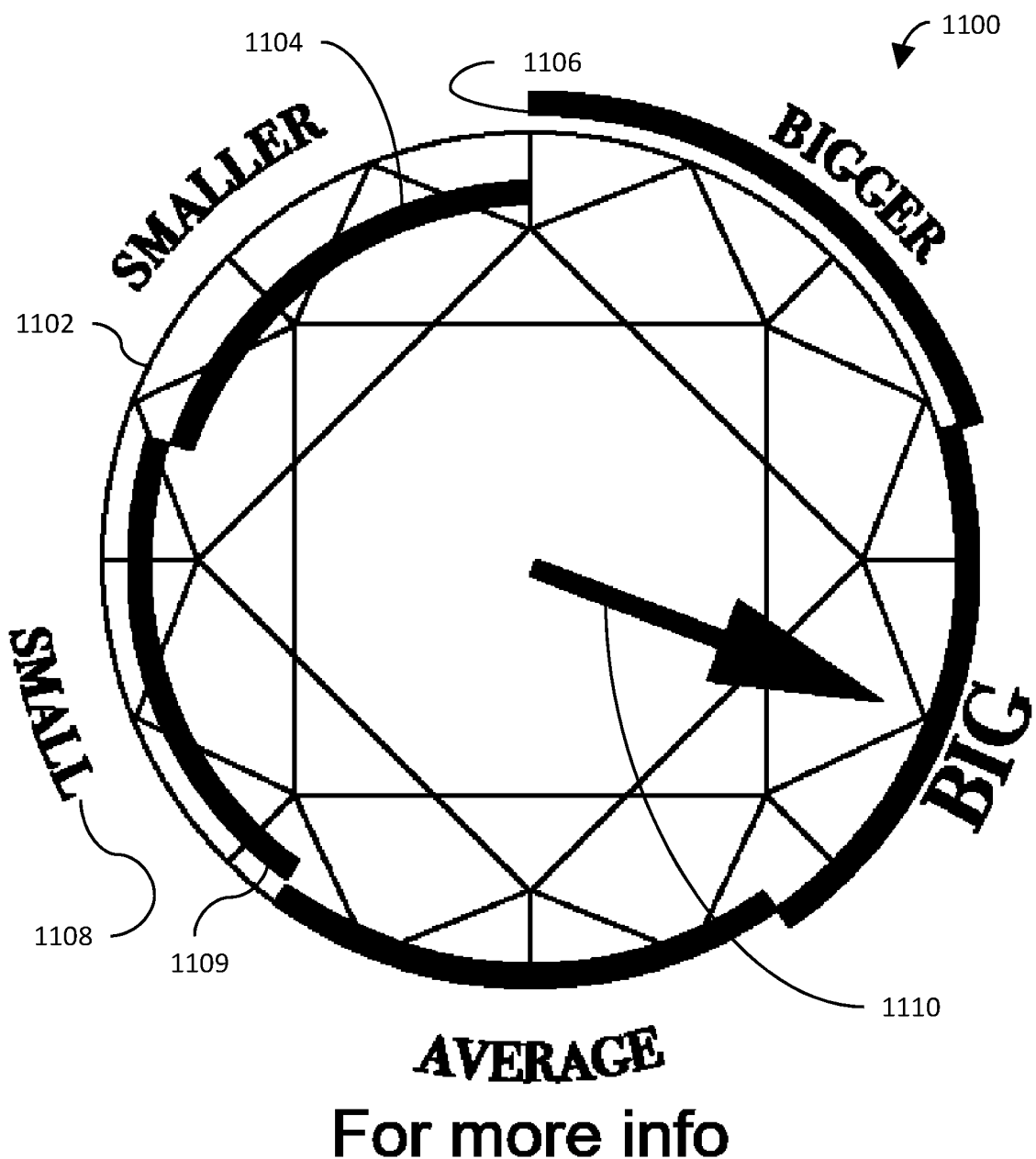
FIG. 11 illustrates a graphical depiction of the gemstone size rating

FIG. 11 shows illustration 1100 that depicts one potential way to graphically display a five-group gemstone size rating. A gemstone of round brilliant cut is shown with a perimeter 1102. An inscribed bar 1104 is offset from the perimeter 1102 showing how much smaller a diamond with a smaller rating may appear. An offset bar 1106 is showing how much bigger a gemstone with a figure rating may appear. The offset bars are coupled with the grading as is shown with the "SMALL" text 1108 near the small inscribed bar 1109. An arrow 1110 may point to the grade.

By studying actual diamonds with different proportions and cut qualities side by side it may be possible to establish a reference benchmark database, but because there are millions of possible proportion combinations an exhaustive reference benchmark database would take an extraordinary amount of time, effort and access to a large collection of diamonds that would be hard to come by. In addition, variations in the sample/reference population relating to factors such as color and clarity would exist, which is not ideal and should be eliminated.

Therefore, subjective or objective analysis may be applied to the virtual diamonds using ray tracing software tools from a "face up" position, and various tilted positions.

Variations and additions are possible to the system as will be apparent to those skilled in the art.

The invention claimed is:

1. A gemstone periphery light qualification system comprising:
   a gemstone parameter instrument that provides gemstone parameters where the gemstone parameters allow a dimension of the girdle to be known;
   a periphery light gauge that generates a periphery light score using the gemstone parameters and a known lighting configuration to quantify the light performance of the periphery of the gemstone when viewed from the top of the cut gemstone; and
   a qualifier that uses the dimension of the girdle and the periphery light score to generate a gemstone size rating.

2. The gemstone periphery light qualification system of claim 1 where the gemstone size rating is a gemstone size based on a benchmark cut.

3. The gemstone periphery light qualification system of claim 1 where the gemstone size rating includes at least one of the following smaller, small, average, big or bigger.

4. The gemstone periphery light qualification system of claim 1 where the gemstone size rating includes a graphical display that shows an indicator of the physical size and another indicator showing if the apparent size is bigger or smaller than the physical size indicator.

5. The gemstone periphery light qualification system of claim 1 where the light performance is calculated with a gemstone at various tilt angles.

6. The gemstone periphery light qualification system of claim 1 where the gemstone parameter instrument is capable of gathering measured facet information of one or more facets of a gemstone, where the gemstone is a cut gemstone, and where the gemstone parameters includes the measured facet information of one or more facets.

7. The system of claim 1 where the gemstone parameter instrument is capable of scanning a rough gemstone and providing gemstone parameters for a cut gemstone that can be cut from the rough gemstone.

8. The system of claim 1 where the gemstone parameter instrument is an input screen that allows entry of the gemstone parameters.

9. The system of claim 8 where the gemstone parameter includes one or more selected from the group consisting of:
   a crown angle,
   a pavilion angle,
   a table dimension,
   a girdle thickness,
   a top view dimension,
   a weight,
   a star girdle lengths, and
   a lower girdle length.

10. The system of claim 1 where the gemstone parameter instrument gathers at least one digital image of a gemstone when viewed from the top where the at least one image is captured with the gemstone in a known lighting environment and the gemstone parameters includes the at least one image, where the periphery light gauge identifies periphery related pixels associated to the periphery of the gemstone and quantifies the light performance using the periphery related pixels.

11. The system of claim 1 where the periphery light gauge uses the gemstone parameters and light ray tracing to produce at least one image of a gemstone in digital form with the at least one image is composed of pixels, where the at least one image is captured with the gemstone in a known lighting environment and the gemstone parameters includes the at least one image, where the periphery light gauge identifies periphery related pixels associated to the periphery of the gemstone and quantifies the light performance using the periphery related pixels.

12. The system of claim 1 where the qualifier uses summary information gathered from objective data derived from ray tracing software or subjective data gather by requesting observations from people of gemstones.

13. The system of claim 1 where the gemstone parameter instrument is a device that is capable of scanning a rough gemstone and provide gemstone parameters of a cut gemstone that can be created from the rough gemstone.

14. A gemstone periphery light qualification system comprising:
   a gemstone parameter instrument that provides gemstone parameters where the gemstone parameters allow the top view cross sectional area of the gemstone to be known, and allows the pavilion angle of the gemstone to be known and the crown angle of the gemstone to be known; and
   a qualifier that uses the gemstone parameters and summary information to calculate a gemstone size rating, where the summary information was derived from at least one set of matched gemstone pairs where the gemstone pair was composed of a reference gemstone and a benchmark cut gemstone.

15. The system of claim 14 where the gemstone parameter instrument is capable of measuring the facets of a cut gemstone and the provided gemstone parameter includes the measured facet information.

16. The system of claim 14 where the gemstone parameter instrument is a device that is capable of scanning a rough gemstone and provides gemstone parameters of a gemstone that can be cut from the rough gemstone.

17. The system of claim 14 where the gemstone parameter instrument is an input screen that allows entry of the gemstone parameters.

18. The system of claim 14 where the gemstone parameter instrument gathers at least one digital image of a gemstone with the at least one image composed of pixels, where the at least one image is captured with the gemstone in a known lighting environment and the gemstone parameters includes the at least one image.

19. The system of claim 14 where the summary information includes objective comparisons of the at least one set of matched gemstone pairs using data derived from ray tracing software.

20. The system of claim 19 where the summary information includes subjective comparison of observations from people of the at least one set of match gemstone pairs.

* * * * *